(12) United States Patent
Ihara

(10) Patent No.: US 11,440,025 B2
(45) Date of Patent: Sep. 13, 2022

(54) NANOCARBON SEPARATION DEVICE AND NANOCARBON SEPARATION METHOD

(71) Applicant: NEC Corporation, Tokyo (JP)

(72) Inventor: Kazuki Ihara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 335 days.

(21) Appl. No.: 16/758,320

(22) PCT Filed: Oct. 26, 2017

(86) PCT No.: PCT/JP2017/038746
§ 371 (c)(1),
(2) Date: Apr. 22, 2020

(87) PCT Pub. No.: WO2019/082340
PCT Pub. Date: May 2, 2019

(65) Prior Publication Data
US 2020/0338570 A1 Oct. 29, 2020

(51) Int. Cl.
B03C 5/02 (2006.01)
C01B 32/172 (2017.01)
(Continued)

(52) U.S. Cl.
CPC .............. B03C 5/02 (2013.01); C01B 32/172 (2017.08); C01B 32/174 (2017.08); B82Y 40/00 (2013.01)

(58) Field of Classification Search
CPC ....... B03C 5/02; B03C 2201/26; B03C 5/026; C01B 32/172; C01B 32/174; C01B 2202/02; C01B 2202/22; C01B 32/159; C01B 32/158; C01B 32/16; C01B 32/162; C01B 32/164; C01B 32/166; C01B 32/168; C01B 32/17; C01B 32/176; C01B 32/178; C01B 2202/00; C01B 2202/04; C01B 2202/06; C01B 2202/08; C01B 2202/10; C01B 2202/20; C01B 2202/24; C01B 2202/26; C01B 2202/28; C01B 2202/30;
(Continued)

(56) References Cited

U.S. PATENT DOCUMENTS

2012/0103809 A1* 5/2012 Ihara ..................... C01B 32/172
204/600

FOREIGN PATENT DOCUMENTS

JP 2008-155150 A 7/2006
JP 2008-285386 A 11/2008
(Continued)

OTHER PUBLICATIONS

Machine Translation of JP 2017-001919 A to NEC Corp. (Year: 2017).*

(Continued)

Primary Examiner — Daniel C. McCracken
(74) Attorney, Agent, or Firm — Sughrue Mion, PLLC

(57) ABSTRACT

A nanocarbon separation device includes a separation tank that is configured to accommodate a dispersion liquid including nanocarbons, a first electrode that is provided at an upper part in the separation tank, a second electrode that is provided at a lower part in the separation tank, an evaluation unit that is configured to evaluate a physical state or a chemical state of the dispersion liquid, and a fractionation unit that is configured to fractionate the dispersion liquid based on the physical state or the chemical state.

11 Claims, 20 Drawing Sheets

(51) Int. Cl.
*C01B 32/174* (2017.01)
*B82Y 40/00* (2011.01)

(58) Field of Classification Search
CPC ............ C01B 2202/32; C01B 2202/34; C01B 2202/36; C01B 32/182; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; C01B 32/15; C01B 32/18; C01B 32/152; C01B 32/154; C01B 32/156; B82Y 40/00; B01D 57/02; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133

See application file for complete search history.

(56) References Cited

FOREIGN PATENT DOCUMENTS

JP          2017-001919 A      1/2017
WO          2010/150808 A1     12/2010

OTHER PUBLICATIONS

Machine Translation of JP 2008-155150A to Toshiba Corp. (Year: 2008).*

International Search Report for PCT/JP2017/038746 dated Jan. 9, 2018 {PC/ISA/210].

* cited by examiner

NANOCARBON SEPARATION DEVICE AND NANOCARBON SEPARATION METHOD

CROSS REFERENCE TO RELATED APPLICATIONS

This application is a National Stage Entry of International Application No. PCT/JP2017/038746 filed Oct. 26, 2017.

TECHNICAL FIELD

The present invention relates to a nanocarbon separation device and a nanocarbon separation method.

BACKGROUND ART

In recent years, it has been expected that carbon materials having a size in a nanometer range (hereinafter referred to as "nanocarbons") will be applied to various fields due to their mechanical properties, electrical properties, chemical properties, and the like.

In the case of nanocarbons, nanocarbons having different properties are simultaneously produced in a manufacturing stage to form a mixture in some cases. When nanocarbons having different electrical properties are used in an electronic material when mixed together, a problem such as deterioration in the characteristics thereof is likely to be caused. Thus, it is necessary to separate nanocarbons having desirable properties from the generated nanocarbon mixture.

In order to separate a nanocarbon mixture, Patent Document 1 describes a nanocarbon material separation method including a step of introducing a dispersion liquid including nanocarbon materials dispersed in nanocarbon micelle groups having a plurality of different charges and a holding solution having a specific gravity different from that of the nanocarbon materials into an electrophoresis tank by laminating the solutions and arranging them in a predetermined direction, and a step of separating the nanocarbon micelle groups into two or more nanocarbon micelle groups by applying a voltage in a serial direction to the introduced, arranged, and laminated dispersion liquids and holding solution.

PRIOR ART DOCUMENTS

Patent Documents

[Patent Document 1] PCT International Publication No. WO 2010/150808

SUMMARY OF THE INVENTION

Problem to be Solved by the Invention

However, there were problems in the recovery operation of the separation method described in Patent Document 1.

That is, in the separation method described in Patent Document 1, the separation state might vary depending on various conditions, and it was difficult to fractionate separated nanocarbons with stable quality.

An object of the present invention is to provide a nanocarbon separation device and a nanocarbon separation method through which, in separation of nanocarbons having different properties, it is easy to fractionate separated nanocarbons with stable quality.

Means for Solving the Problem

A nanocarbon separation device of the present invention includes a separation tank that is configured to accommodate a dispersion liquid including a nanocarbon; a first electrode that is provided at an upper part in the separation tank; a second electrode that is provided at a lower part in the separation tank; an evaluation means that is configured to evaluate a physical state or a chemical state of the dispersion liquid; and a fractionation means that is configured to fractionate the dispersion liquid based on the physical state or the chemical state.

A nanocarbon separation method of the present invention includes a step of injecting a dispersion liquid including a nanocarbon into a separation tank; a step of separating the metallic nanocarbons and the semiconducting nanocarbons by applying a direct current voltage between a first electrode provided at an upper part in the separation tank and a second electrode provided at a lower part in the separation tank, to cause metallic nanocarbons included in the dispersion liquid to move toward the first electrode, and to cause semiconducting nanocarbons included in the dispersion liquid to move toward the second electrode; a step of evaluating a physical state or a chemical state of the dispersion liquid; and a step of fractionating the dispersion liquid based on the physical state or the chemical state.

Effect of the Invention

According to the present invention, in separation of nanocarbons having different properties, it is possible to fractionate separated nanocarbons with stable quality.

EMBODIMENTS FOR CARRYING OUT THE INVENTION

A nanocarbon separation device and a nanocarbon separation method according to example embodiments of the present invention will be described.

Here, the present example embodiment is described in detail to allow better understanding of the spirit of the present invention, and does not limit the present invention unless otherwise specified.

First Example Embodiment (Nanocarbon Separation Device)

Figure 1:
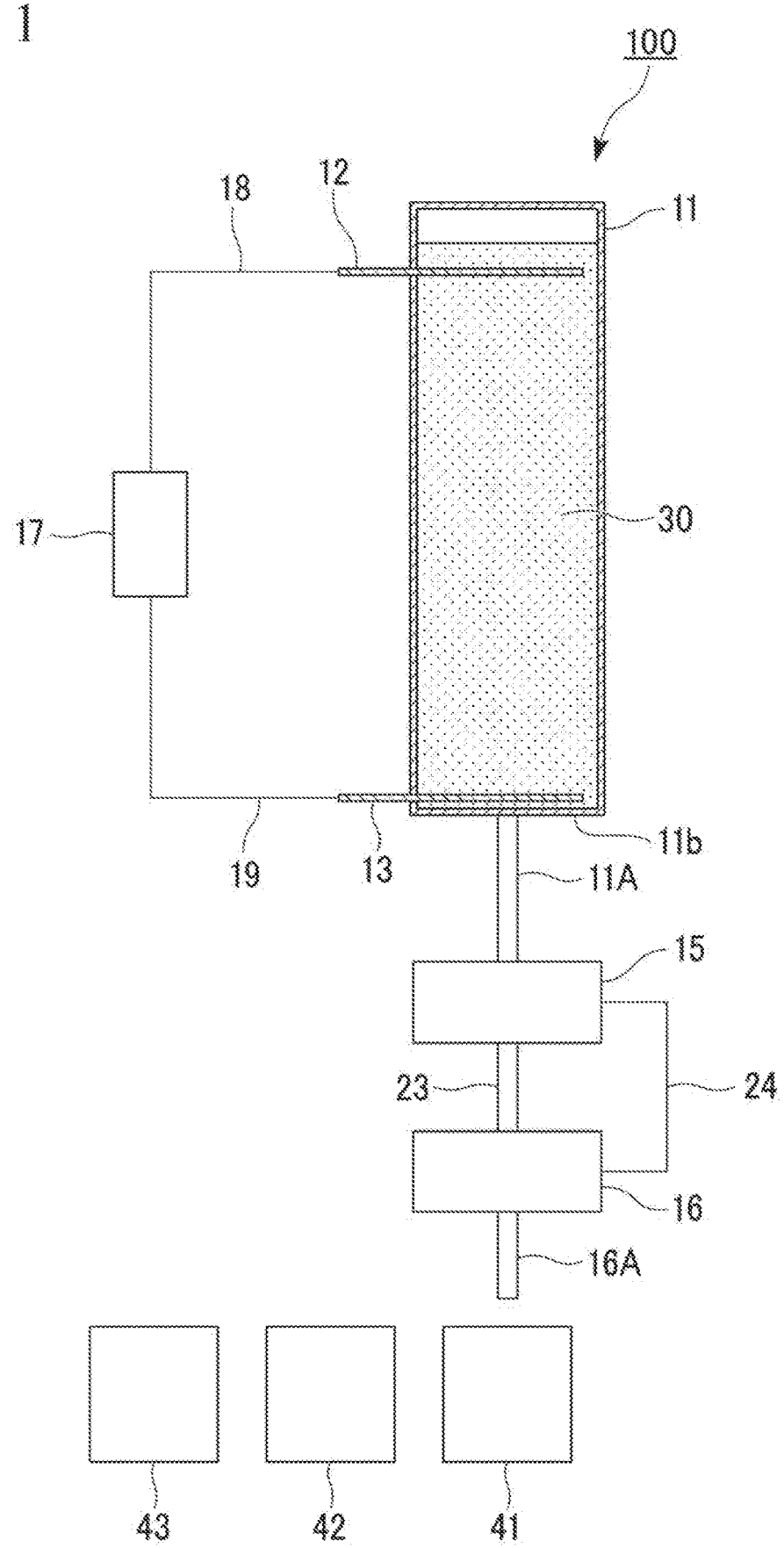
FIG. 1 is a schematic view showing a nanocarbon separation device of a first example embodiment.

FIG. 1 is a schematic view showing a nanocarbon separation device of the present example embodiment.

A nanocarbon separation device 100 of the present example embodiment includes a separation tank (electrophoresis tank) 11 in which a nanocarbon-containing dispersion liquid (hereinafter referred to as a "nanocarbon dispersion liquid") 30 is accommodated, a first electrode 12 provided at an upper part in the separation tank 11, a second electrode 13 provided at a lower part in the separation tank 11, a recovery port 11A through which a solution is recovered from the separation tank 11, an evaluation means 15 that evaluates a physical and chemical properties of the nanocarbon dispersion liquid 30, which is attached to connect the recovery port 11A to a flow path 23, and a fractionation means 16 which is attached to the termination of the flow path 23 and fractionates the nanocarbon dispersion liquid 30 based on the physical state or chemical state of the nanocarbon dispersion liquid 30 evaluated by the evaluation means 15. In addition, the nanocarbon separation device 10 of the present example embodiment includes a direct current (DC) power supply 17 that applies a direct current voltage between the first electrode 12 and the second electrode 13. The direct current power supply 17 is electrically connected to the first electrode 12 via a cable 18 and is electrically connected to the second electrode 13 via a cable 19.

In the present example embodiment, to fractionate the nanocarbon dispersion liquid 30 means that, for example, the dispersion liquid 30 having a relatively large amount of metallic nanocarbons and the nanocarbon dispersion liquid 30 having a relatively large amount of semiconducting nanocarbons are separately recovered (fractionated).

(Separation Tank Structure)

In the separation tank 11, the nanocarbon dispersion liquid 30 to be separated is accommodated, and nanocarbons dispersed in the accommodated nanocarbon dispersion liquid 30 are separated through electrophoresis. The shape and size of the separation tank 11 are not particularly limited as long as the separation tank 11 can accommodate the nanocarbon dispersion liquid 30.

The material of the separation tank 11 is not particularly limited as long as it is stable with respect to the nanocarbon dispersion liquid 30 and is an insulating material. Examples of materials of the separation tank 11 include glass, quartz, and acrylic resin.

The separation tank 11 has the recovery port 11A that communicates with an outer bottom surface 11b of the separation tank 11 at the lower end. The recovery port 11A is connected to the evaluation means 15. In addition, the recovery port 11A has a closed structure (not shown) such as a rotary cock having a ground glass joint.

In the separation tank 11, the first electrode 12 and the second electrode 13 are provided. The first electrode 12 is disposed at an upper part in the separation tank 11 so that it is immersed in or in contact with the nanocarbon dispersion liquid 30. The second electrode 13 is disposed at a lower part in the separation tank 11 so that it is immersed in or in contact with the nanocarbon dispersion liquid 30.

The material of the first electrode 12 and the second electrode 13 is not particularly limited as long as it can be used for electrophoresis and is stable with respect to the nanocarbon dispersion liquid 30. Examples of the first electrode 12 and the second electrode 13 include a platinum electrode.

The structures of the first electrode 12 and the second electrode 13 are not particularly limited, and in the separation tank 11, are appropriately selected according to the amount (volume) of the nanocarbon dispersion liquid 30 accommodated in the separation tank 11 or the like. Examples of structures of the first electrode 12 and the second electrode 13 include an annular shape, a disk shape, and a rod shape in a plan view of the separation tank 11. In addition, examples of structures of the first electrode 12 and the second electrode 13 include a porous plate shape in which a plurality of fine pores are uniformly provided.

(Evaluation Means)

The evaluation means 15 that evaluates a physical state or chemical state of the nanocarbon dispersion liquid 30 is attached to connect the recovery port 11A to the flow path 23.

The evaluation means 15 evaluates the physical state or chemical state of the nanocarbon dispersion liquid 30 recovered from the recovery port 11A. The evaluation means 15 evaluates one or more physical states or chemical states. The evaluation means 15 in the present example embodiment measures the pH of the recovered nanocarbon dispersion liquid 30.

In the evaluation means 15 in the present example embodiment, the pH of the nanocarbon dispersion liquid 30 in the recovery port 11A is measured. Here, the evaluation means 15 is not limited to a means that measures the pH of the nanocarbon dispersion liquid 30 as long as the evaluation means 15 measures a physical state or chemical state of the nanocarbon dispersion liquid 30 in the recovery port 11A. The evaluation means 15 may be, for example, a means that measures the absorbance of the nanocarbon dispersion liquid 30, a means that measures the emission spectrum of the nanocarbon dispersion liquid 30, a means that measures the refractive index of the nanocarbon dispersion liquid 30, or a means that measures the conductivity of the nanocarbon dispersion liquid 30.

The evaluation means 15 is electrically connected to the fractionation means 16 via a cable 24. The evaluation means 15 can convert the measurement result into an electrical signal, and output it to the fractionation means 16.

(Flow Rate Measurement and Fractionation Means)

The fractionation means 16 fractionates the nanocarbon dispersion liquid 30 based on the physical state or chemical state obtained by the evaluation means 15. The fractionation means 16 can be moved according to the positions of recovery tanks 41, 42, and 43. Therefore, the fractionation means 16 separately recovers (fractionates) the nanocarbon dispersion liquid 30 in the recovery tanks 41, 42, and 43 according to the amount of metallic nanocarbons and semiconducting nanocarbons in the nanocarbon dispersion liquid 30. In addition, the fractionation means 16 has a drain port 16A. The fractionation means 16 injects the nanocarbon dispersion liquid 30 into the recovery tanks 41, 42, and 43 through the drain port 16A.

In addition, the fractionation means 16 includes a flowmeter that measures a flow rate of the nanocarbon dispersion liquid 30 drained to the recovery tanks 41, 42, and 43.

(Nanocarbon Separation Method)

Figure 2:
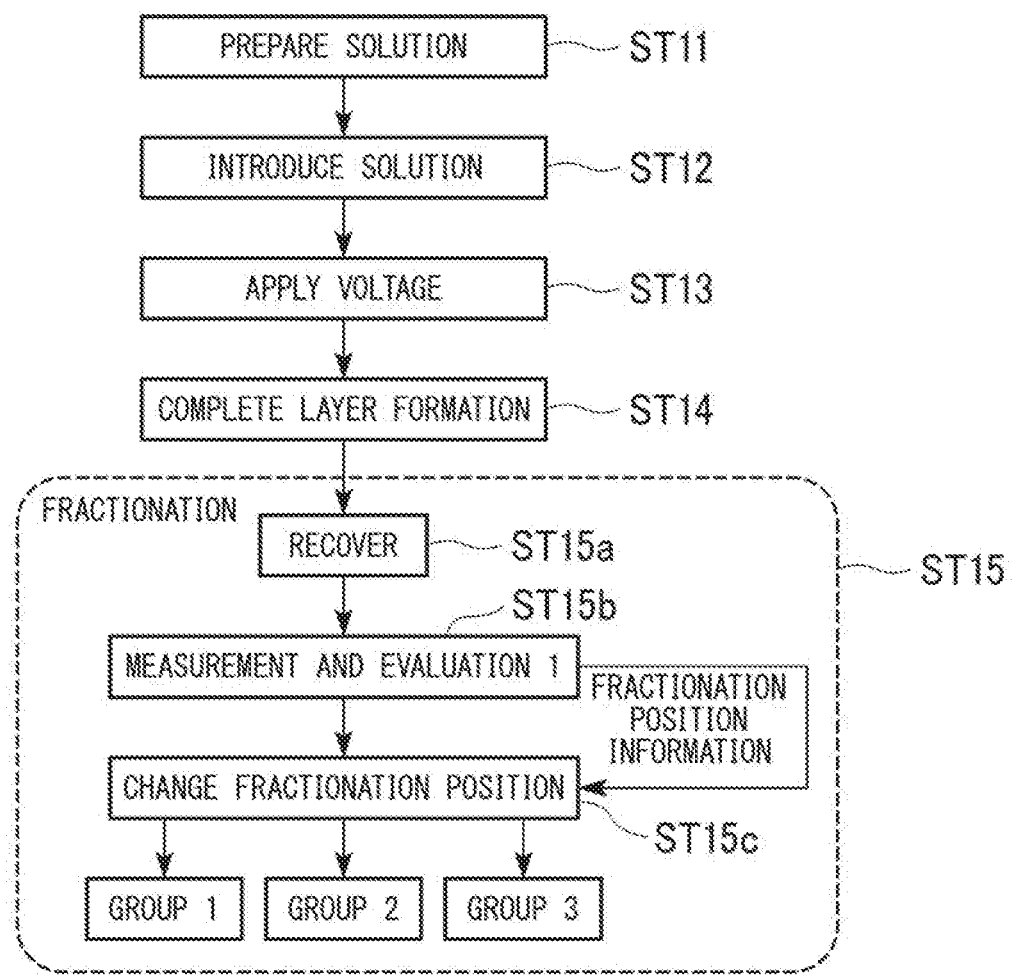
FIG. 2 is a flowchart showing a nanocarbon separation method of the first example embodiment.

A nanocarbon separation method using the nanocarbon separation device 100 will be described and also operations of the nanocarbon separation device 100 will be described with reference to FIG. 1 to FIG. 3. FIG. 2 is a flowchart showing a nanocarbon separation method of the present example embodiment.

The nanocarbon separation method of the present example embodiment includes a step of injecting the nanocarbon dispersion liquid 30 into the separation tank 11 (hereinafter referred to as an "injection step"), a step in which a direct current voltage is applied between the first electrode 12 provided at an upper part in the separation tank 11 and the second electrode 13 provided at a lower part in the separation tank 11, metallic nanocarbons contained in the nanocarbon dispersion liquid 30 are caused to move toward the first electrode 12, semiconducting nanocarbons contained in the nanocarbon dispersion liquid 30 are caused to move toward the second electrode 13, and the metallic nanocarbons and the semiconducting nanocarbons are separated (hereinafter referred to as a "separation step"), a step of evaluating a physical state or chemical state of the nanocarbon dispersion liquid 30 (hereinafter referred to as an "evaluation step"), and a step of fractionating the nanocarbon dispersion liquid 30 based on the physical state or chemical state of the nanocarbon dispersion liquid 30 (hereinafter referred to as a "fractionation step").

In the nanocarbon separation method of the present example embodiment, the nanocarbon refers to a carbon material mainly composed of carbon such as single-walled carbon nanotubes, double-walled carbon nanotubes, multi-walled carbon nanotubes, carbon nanohorns, carbon nanotwists, graphene, fullerene, and the like. In the nanocarbon separation method of the present example embodiment, a case in which semiconducting single-walled carbon nanotubes and metallic single-walled carbon nanotubes are separated from a dispersion liquid in which single-walled carbon nanotubes as nanocarbons are dispersed will be described in detail.

It is known that single-walled carbon nanotubes are divided into a metallic type and a semiconducting type with two different properties according to the diameter of the tube and a winding configuration. When single-walled carbon nanotubes are synthesized using a conventional production method, a mixture of single-walled carbon nanotubes including metallic single-walled carbon nanotubes having metallic properties and semiconducting single-walled carbon nanotubes having semiconducting properties at a statistical ratio of 1:2 is obtained.

The mixture of single-walled carbon nanotubes is not particularly limited as long as it contains metallic single-walled carbon nanotubes and semiconducting single-walled carbon nanotubes. In addition, the single-walled carbon nanotubes in the present example embodiment may be single-walled carbon nanotubes alone or single-walled carbon nanotubes in which some of carbon atoms are substituted with an arbitrary functional group or single-walled carbon nanotubes that are modified with an arbitrary functional group.

First, a single-walled carbon nanotube dispersion liquid in which a mixture of single-walled carbon nanotubes is dispersed in a dispersion medium together with a surfactant is prepared (ST11).

The dispersion medium is not particularly limited as long as it allows the mixture of single-walled carbon nanotubes to be dispersed. Examples of dispersion mediums include water, heavy water, an organic solvent, and an ionic liquid. Among these dispersion mediums, water or heavy water is suitably used because single-walled carbon nanotubes do not deteriorate therein.

Regarding the surfactant, a non-ionic surfactant, a cationic surfactant, an anionic surfactant and the like are used. A non-ionic surfactant is preferably used in order to prevent ionic impurities such as sodium ions from being mixed into single-walled carbon nanotubes.

Regarding the non-ionic surfactant, a non-ionic surfactant having a non-ionizable hydrophilic moiety and a hydrophobic moiety such as an alkyl chain is used. Examples of such a non-ionic surfactant include a non-ionic surfactant having a polyethylene glycol structure represented by a polyoxyethylene alkyl ether type.

Regarding such a non-ionic surfactant, a polyoxyethylene alkyl ether represented by the following Formula (1) is suitably used.

$$C_nH_{2n}(OCH_2CH_2)_mOH \quad (1)$$

(here, n=12 to 18, m=20 to 100)

Examples of a polyoxyethylene alkyl ether represented by Formula (1) include polyoxyethylene (23) lauryl ether (product name: Brij L23, commercially available from Sigma-Aldrich), polyoxyethylene (20) cetyl ether (product name: Brij C20, commercially available from Sigma-Aldrich), polyoxyethylene (20) stearyl ether (product name: Brij S20, commercially available from Sigma-Aldrich), polyoxyethylene (20) oleyl ether (product name: Brij O20, commercially available from Sigma-Aldrich), and polyoxyethylene (100) stearyl ether (product name: Brij S100, commercially available from Sigma-Aldrich).

Regarding the non-ionic surfactant, polyoxyethylene sorbitan monostearate (molecular formula: $C_{64}H_{126}O_{26}$, product name: Tween 60, commercially available from Sigma-Aldrich), polyoxyethylene sorbitan trioleate (molecular formula: $C_{24}H_{44}O_6$, product name: Tween 85, commercially available from Sigma-Aldrich), octylphenol ethoxylate (molecular formula: $C_{14}H_{22}O(C_2H_4O)_n$, n=1 to 10, product name: Triton X-100, commercially available from Sigma-Aldrich), polyoxyethylene (40) isooctyl phenyl ether (molecular formula: $C_8H_{17}C_6H_4O(CH_2CH_{20})_{40}H$, product name: Triton X-405, commercially available from Sigma- Aldrich), poloxamer (molecular formula: $C_5H_{10}O_2$, product name: Pluronic, commercially available from Sigma-Aldrich), and polyvinyl pyrrolidone (molecular formula: $(C_6H_9NO)_n$, n=5 to 100, commercially available from Sigma-Aldrich) or the like can be used.

The amount of the non-ionic surfactant in the single-walled carbon nanotube dispersion liquid is preferably 0.1 wt % or more and 5 wt % or less and more preferably 0.5 wt % or more and 2 wt % or less.

When the amount of the non-ionic surfactant is 5 wt % or less, the viscosity of the single-walled carbon nanotube dispersion liquid does not become too high, metallic single-walled carbon nanotubes and semiconducting single-walled carbon nanotubes contained in the single-walled carbon nanotube dispersion liquid can be easily separated through electrophoresis.

The amount of single-walled carbon nanotubes in the single-walled carbon nanotube dispersion liquid is preferably 1 µg/mL or more and 100 µg/mL or less and more preferably 5 µg/mL or more and 40 µg/mL or less.

When the amount of single-walled carbon nanotubes is within the above range, metallic single-walled carbon nanotubes and semiconducting single-walled carbon nanotubes contained in the single-walled carbon nanotube dispersion liquid can be easily separated through electrophoresis.

A method of preparing a single-walled carbon nanotube dispersion liquid is not particularly limited, and a known method is used. For example, a method in which a mixed solution of a dispersion medium containing a mixture of single-walled carbon nanotubes and a surfactant is subjected to an ultrasonic treatment and the mixture of single-walled carbon nanotubes is dispersed in the dispersion medium is an exemplary example. According to this ultrasonic treatment, the aggregated metallic single-walled carbon nanotubes and semiconducting single-walled carbon nanotubes are sufficiently separated, and in the single-walled carbon nanotube dispersion liquid, metallic single-walled carbon nanotubes and semiconducting single-walled carbon nanotubes are uniformly dispersed in the dispersion medium. Thereby, metallic single-walled carbon nanotubes and semiconducting single-walled carbon nanotubes are easily separated through electrophoresis to be described below. Here, metallic single-walled carbon nanotubes and semiconducting single-walled carbon nanotubes that are not dispersed according to an ultrasonic treatment are preferably removed by separation through ultracentrifugation.

Next, in the injection step, the single-walled carbon nanotube dispersion liquid is injected into the separation tank 11 (ST12).

Next, when a direct current voltage is applied to the first electrode 12 and the second electrode 13 for a predetermined time (for example, 1 hour to 100 hours) (ST13), an electric field is formed in the separation tank 11. Specifically, the electric field is formed so that the direction of the electric field is directed from the bottom of the separation tank 11 upward. Due to an electrophoretic force generated by the electric field and the charge of single-walled carbon nanotubes, metallic single-walled carbon nanotubes contained in the single-walled carbon nanotube dispersion liquid move toward the first electrode 12, and semiconducting single-walled carbon nanotubes move toward the second electrode 13. As described above, the mixture is separated into metallic single-walled carbon nanotubes and semiconducting single-walled carbon nanotubes through electrophoresis (ST14).

Figure 3:
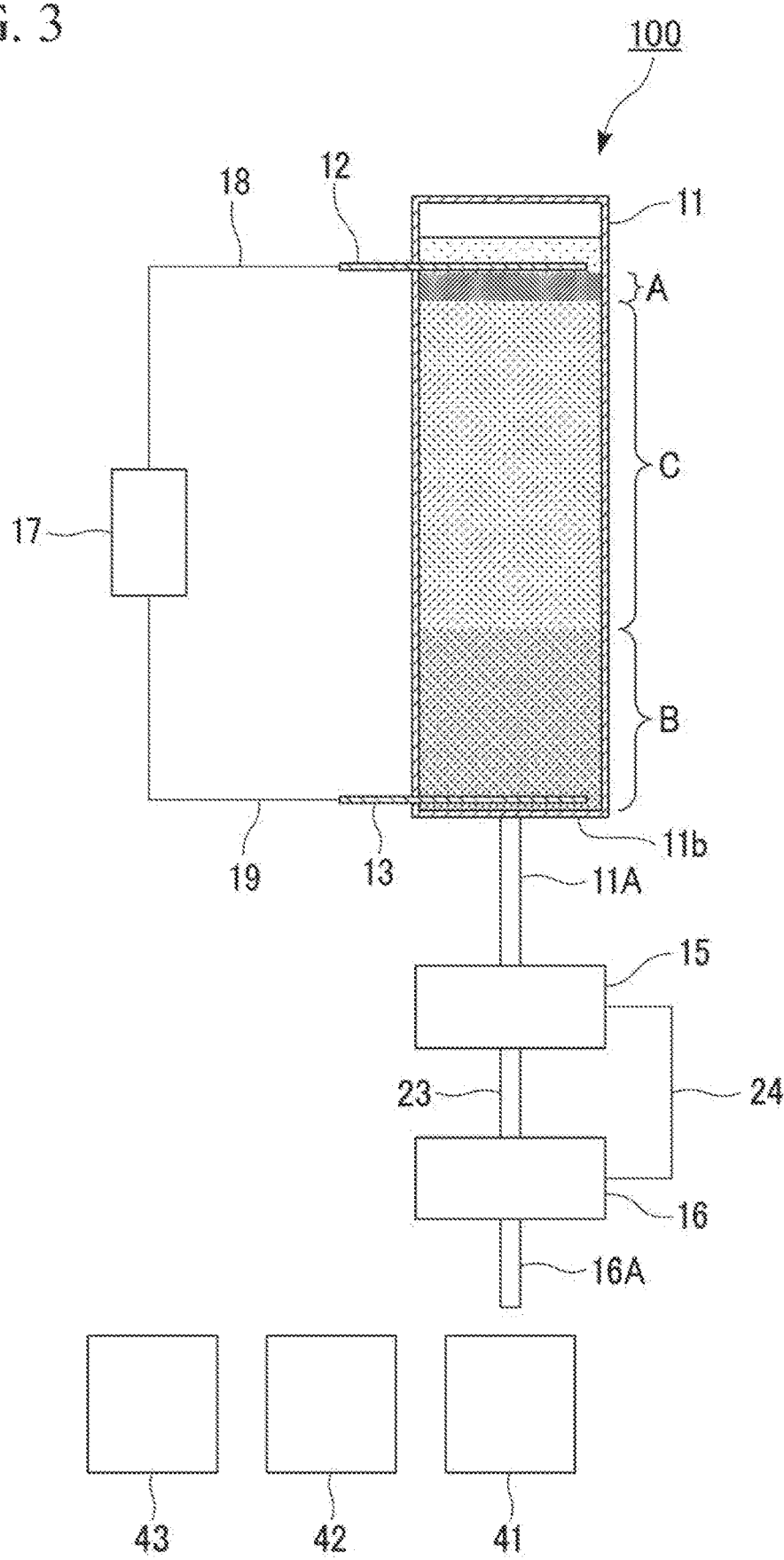
FIG. 3 is a schematic view showing the nanocarbon separation method of the first example embodiment.

Based on the result of electrophoresis, as shown in FIG. 3, the phase of the single-walled carbon nanotube dispersion liquid is separated into three phases including a dispersion liquid phase having a relatively large amount of metallic single-walled carbon nanotubes (hereinafter referred to as a "dispersion liquid phase A"), a dispersion liquid phase having a relatively large amount of semiconducting single-walled carbon nanotubes (hereinafter referred to as a "dispersion liquid phase B"), and a dispersion liquid phase which is formed between the dispersion liquid phase A and the dispersion liquid phase B and has a relatively small amount of metallic single-walled carbon nanotubes and semiconducting single-walled carbon nanotubes (hereinafter referred to as a "dispersion liquid phase C").

In the present example embodiment, the dispersion liquid phase A is formed on the side of the first electrode 12, and the dispersion liquid phase B is formed on the side of the second electrode 13.

A direct current voltage applied to the first electrode 12 and the second electrode 13 is not particularly limited, and is appropriately adjusted according to a distance between the first electrode 12 and the second electrode 13, the amount of the mixture of single-walled carbon nanotubes in the single-walled carbon nanotube dispersion liquid, or the like.

When water or heavy water is used as the dispersion medium of the single-walled carbon nanotube dispersion liquid, a direct current voltage applied to the first electrode 12 and the second electrode 13 has any value that is larger than 0 V and equal to or less than 1,000 V.

In addition, when a direct current voltage is applied to the first electrode 12 and the second electrode 13, the electric field between the first electrode 12 and the second electrode 13 is preferably 0.5 V/cm or more and 15 V/cm or less and more preferably 1 V/cm or more and 10 V/cm or less.

In the separation step, the temperature of the single-walled carbon nanotube dispersion liquid accommodated in the separation tank 11 is not particularly limited as long as it is a temperature at which the dispersion medium of the single-walled carbon nanotube dispersion liquid does not deteriorate or evaporate.

Next, after the separation is completed, the single-walled carbon nanotube dispersion liquid is recovered (ST15a).

The pH of the single-walled carbon nanotube dispersion liquid is evaluated by the evaluation means 15 as a physical state or chemical state of the single-walled carbon nanotube dispersion liquid during recovery (ST15b).

Next, in the fractionation step, the single-walled carbon nanotube dispersion liquid is fractionated based on the pH of the single-walled carbon nanotube dispersion liquid obtained in the evaluation step (ST15c). That is, in the fractionation step, based on the pH of the single-walled carbon nanotube dispersion liquid obtained in the evaluation step, single-walled carbon nanotube dispersion liquids having different amounts of metallic single-walled carbon nanotubes and semiconducting single-walled carbon nanotubes are separately recovered (fractionated) in the recovery tanks 41, 42, and 43.

In the fractionation step, for example, according to respective physical states or chemical states of the dispersion liquid phase A having a relatively large amount of metallic single-walled carbon nanotubes, the dispersion liquid phase B having a relatively large amount of semiconducting single-walled carbon nanotubes, and the dispersion liquid phase C having a relatively small amount of metallic single-walled carbon nanotubes and semiconducting single-walled carbon nanotubes, the single-walled carbon nanotube dispersion liquid is separately recovered (fractionated) in the recovery tanks 41, 42, and 43.

Here, fractionation (ST15) shown in FIG. 2 includes ST15a, ST15b and ST15c.

According to the nanocarbon separation method using the nanocarbon separation device 100 of the present example embodiment, without depending on a method of visually confirming that a dispersion liquid phase has been formed or a time for which a direct current voltage is applied between a pair of electrodes, based on the pH of the single-walled carbon nanotube dispersion liquid in the physical state or chemical state obtained in the evaluation step, the separation state of the fractionated metallic single-walled carbon nanotubes and semiconducting single-walled carbon nanotubes contained in the single-walled carbon nanotube dispersion liquid can be evaluated. Therefore, in a step of fractionating the single-walled carbon nanotube dispersion liquid, it is possible to fractionate the separated single-walled carbon nanotubes with stable quality. In addition, since fractionation is performed according to the separation state, highly pure metallic single-walled carbon nanotubes and semiconducting single-walled carbon nanotubes can be fractionated and obtained.

Here, while a case in which a mixture of single-walled carbon nanotubes is separated into metallic single-walled carbon nanotubes and semiconducting single-walled carbon nanotubes has been provided as an exemplary example of the nanocarbon separation method using the nanocarbon separation device 100 of the present example embodiment, the nanocarbon separation method of the present example embodiment is not limited thereto. In the nanocarbon separation method of the present example embodiment, for example, a single-walled carbon nanotube purifying method in which the mixture is separated into metallic single-walled carbon nanotubes and semiconducting single-walled carbon nanotubes in the separation tank 11, and only single-walled carbon nanotubes having desired properties are then recovered may be performed.

Second Example Embodiment (Nanocarbon Separation Device)

FIG. 2 is a schematic view showing a nanocarbon separation device of the present example embodiment.

The nanocarbon separation device 10 of the present example embodiment includes a separation tank (electrophoresis tank) 11 in which the nanocarbon dispersion liquid 30 is accommodated, the first electrode 12 provided at an upper part in the separation tank 11, the second electrode 13 provided at a lower part in the separation tank 11, an evaluation means 14 that evaluates a physical state or chemical state of the nanocarbon dispersion liquid 30 in the separation tank 11, the recovery port 11A through which a solution is recovered from the separation tank 11, a flowmeter 15 that measures a flow rate of the nanocarbon dispersion liquid 30, which is attached to connect the recovery port 11A to the flow path 23, and the fractionation means 16 which is attached to the termination of the flow path 23 and fractionates the nanocarbon dispersion liquid 30 based on the physical state or chemical state of the nanocarbon dispersion liquid 30 evaluated by the evaluation means 14 and the flow rate of the nanocarbon dispersion liquid 30 evaluated by the flowmeter 15. In addition, the nanocarbon separation device 10 of the present example embodiment includes the direct current power supply 17 that applies a direct current voltage between the first electrode 12 and the second electrode 13. The direct current power supply 17 is electrically connected to the first electrode 12 via the cable 18 and is electrically connected to the second electrode 13 via the cable 19.

In the present example embodiment, fractionation of the nanocarbon dispersion liquid 30 means that, for example, the dispersion liquid 30 having a relatively large amount of metallic nanocarbons and the nanocarbon dispersion liquid 30 having a relatively large amount of semiconducting nanocarbons are separately recovered (fractionated).

(Separation Tank Structure)

In the separation tank 11, the nanocarbon dispersion liquid 30 to be separated is accommodated, and nanocarbons dispersed in the accommodated nanocarbon dispersion liquid 30 are separated through electrophoresis. The shape and size of the separation tank 11 are not particularly limited as long as the separation tank 11 can accommodate the nanocarbon dispersion liquid 30.

The material of the separation tank 11 is not particularly limited as long as it is stable with respect to the nanocarbon dispersion liquid 30 and is an insulating material. Examples of materials of the separation tank 11 include glass, quartz, and acrylic resin.

The separation tank 11 has the recovery port 11A that communicates with the outer bottom surface 11b of the separation tank 11 at the lower end. The recovery port 11A is connected to the flowmeter 15. In addition, the recovery port 11A has a closed structure (not shown) such as a rotary cock having a ground glass joint.

In the separation tank 11, the first electrode 12 and the second electrode 13 are provided. The first electrode 12 is disposed at an upper part in the separation tank 11 so that it is immersed in or in contact with the nanocarbon dispersion liquid 30. The second electrode 13 is disposed at a lower part in the separation tank 11 so that it is immersed in or in contact with the nanocarbon dispersion liquid 30.

The material of the first electrode 12 and the second electrode 13 is not particularly limited as long as it can be used for electrophoresis and is stable with respect to the nanocarbon dispersion liquid 30. Examples of the first electrode 12 and the second electrode 13 include a platinum electrode.

The structures of the first electrode 12 and the second electrode 13 are not particularly limited, and in the separation tank 11, are appropriately selected according to the amount (volume) of the nanocarbon dispersion liquid 30 accommodated in the separation tank 11 or the like. Examples of structures of the first electrode 12 and the second electrode 13 include an annular shape, a disk shape, and a rod shape in a plan view of the separation tank 11. In addition, examples of structures of the first electrode 12 and the second electrode 13 include a porous plate shape in which a plurality of fine pores are uniformly provided.

(Evaluation Means)

The evaluation means 14 that evaluates a physical state or chemical state of the nanocarbon dispersion liquid 30 is attached to the separation tank 11.

The evaluation means 14 evaluates a physical state or chemical state of the nanocarbon dispersion liquid 30 in the separation tank 11. The evaluation means 14 includes a plurality of measurement devices 20 and an evaluation device 21 that is electrically connected to the measurement devices 20.

The measurement device 20 in the present example embodiment is an electrode that measures a potential of the nanocarbon dispersion liquid 30 when a voltage is applied to a first electrode and a second electrode in the separation tank 11.

The measurement device 20 is not particularly limited as long as it does not influence electrophoresis and is stable with respect to the nanocarbon dispersion liquid 30. Examples of the measurement device 20 include a platinum electrode.

The structure of the measurement device 20 is not particularly limited as long as it is a structure that does not restrict movement of metallic nanocarbons and semiconducting nanocarbons contained in the nanocarbon dispersion liquid 30 in the separation tank 11 and is in contact with the nanocarbon dispersion liquid 30.

The measurement device 20 is attached so that an evaluation position in the separation tank 11 can be recognized. The interval at which the plurality of measurement devices 20 are arranged is not particularly limited, and is appropriately adjusted according to the height of the separation tank 11, the amount (volume) of the nanocarbon dispersion liquid 30 accommodated in the separation tank 11, or the like.

While a case in which a potential of the nanocarbon dispersion liquid 30 when a voltage is applied to a first electrode and a second electrode in the separation tank 11 is measured has been provided as an exemplary example of the evaluation means 14 in the present example embodiment, the evaluation means 14 is not limited thereto as long as it measures a physical state or chemical state of the nanocarbon dispersion liquid 30 at each position in the separation tank 11. For example, as the physical state or chemical state of the nanocarbon dispersion liquid 30 measured by the measurement device 20, the pH of the nanocarbon dispersion liquid 30, the absorbance of the nanocarbon dispersion liquid 30, the emission spectrum of the nanocarbon dispersion liquid 30, the refractive index of the nanocarbon dispersion liquid 30, or the conductivity of the nanocarbon dispersion liquid 30 may be measured.

The evaluation device 21 is electrically connected to the cable 24 that electrically connects a flowmeter 25 and the fractionation means 16 via a cable 22. The evaluation device 21 can convert the measurement result obtained from the electrically connected measurement device 20 into an electrical signal and output it to the fractionation means 16.

(Flow Rate Measurement and Fractionation Means)

The flowmeter 25 is attached to the flow path 23. The flowmeter 25 measures the amount of the nanocarbon dispersion liquid 30 that passes through the recovery path 11A. The flowmeter 25 is connected to the fractionation means 16 via the cable 24.

The fractionation means 16 fractionates the nanocarbon dispersion liquid 30 based on the physical state or chemical state of the nanocarbon dispersion liquid 30 evaluated by the evaluation means 15 and the flow rate of the nanocarbon dispersion liquid 30 measured by the flowmeter 25. The fractionation means 16 can be moved according to the positions of recovery tanks 41, 42, and 43. Therefore, the fractionation means 16 separately recovers (fractionates) the nanocarbon dispersion liquid 30 in the recovery tanks 41, 42, and 43 according to the amount of metallic nanocarbons and semiconducting nanocarbons in the nanocarbon dispersion liquid 30. In addition, the fractionation means 16 has a drain port 16A. The fractionation means 16 injects the nanocarbon dispersion liquid 30 into the recovery tanks 41, 42, and 43 through the drain port 16A.

(Nanocarbon Separation Method)

A nanocarbon separation method using the nanocarbon separation device 10 will be described and also operations of the nanocarbon separation device 10 will be described with reference to FIG. 4 to FIG. 6. FIG. 6 is a flowchart showing a nanocarbon separation method of the present example embodiment.

The nanocarbon separation method of the present example embodiment includes a step of injecting the nanocarbon dispersion liquid 30 into the separation tank 11 (hereinafter referred to as an "injection step"), a step in which a direct current voltage is applied between the first electrode 12 provided at an upper part in the separation tank 11 and the second electrode 13 provided at a lower part in the separation tank 11, metallic nanocarbons contained in the nanocarbon dispersion liquid 30 are caused to move toward the first electrode 12, semiconducting nanocarbons contained in the nanocarbon dispersion liquid 30 are caused to move toward the second electrode 13, and the metallic nanocarbons and the semiconducting nanocarbons are separated (hereinafter referred to as a "separation step"), a step of evaluating a physical state or chemical state of the nanocarbon dispersion liquid 30 (hereinafter referred to as an "evaluation step"), and a step of fractionating the nanocarbon dispersion liquid 30 based on the physical state or chemical state of the nanocarbon dispersion liquid 30 (hereinafter referred to as a "fractionation step").

In the nanocarbon separation method of the present example embodiment, the nanocarbon refers to a carbon material mainly composed of carbon such as single-walled carbon nanotubes, double-walled carbon nanotubes, multi-walled carbon nanotubes, carbon nanohorns, carbon nanotwists, graphene, fullerene, and the like. In the nanocarbon separation method of the present example embodiment, a case in which semiconducting single-walled carbon nanotubes and metallic single-walled carbon nanotubes are separated from a dispersion liquid in which single-walled carbon nanotubes as nanocarbons are dispersed will be described in detail.

It is known that single-walled carbon nanotubes are divided into a metallic type and a semiconducting type with two different properties according to the diameter of the tube and a winding configuration. When single-walled carbon nanotubes are synthesized using a conventional production method, a mixture of single-walled carbon nanotubes including metallic single-walled carbon nanotubes having metallic properties and semiconducting single-walled carbon nanotubes having semiconducting properties at a statistical ratio of 1:2 is obtained.

The mixture of single-walled carbon nanotubes is not particularly limited as long as it contains metallic single-walled carbon nanotubes and semiconducting single-walled carbon nanotubes. In addition, the single-walled carbon nanotubes in the present example embodiment may be single-walled carbon nanotubes alone or single-walled carbon nanotubes in which some of carbon atoms are substituted with an arbitrary functional group or single-walled carbon nanotubes that are modified with an arbitrary functional group.

First, a single-walled carbon nanotube dispersion liquid in which a mixture of single-walled carbon nanotubes is dispersed in a dispersion medium together with a surfactant is prepared (ST1).

The dispersion medium is not particularly limited as long as it allows the mixture of single-walled carbon nanotubes to be dispersed. Examples of dispersion mediums include water, heavy water, an organic solvent, and an ionic liquid. Among these dispersion mediums, water or heavy water is suitably used because single-walled carbon nanotubes do not deteriorate therein.

Regarding the surfactant, a non-ionic surfactant, a cationic surfactant, an anionic surfactant and the like are used. A non-ionic surfactant is preferably used in order to prevent ionic impurities such as sodium ions from being mixed into single-walled carbon nanotubes.

Regarding the non-ionic surfactant, a non-ionic surfactant having a non-ionizable hydrophilic moiety and a hydrophobic moiety such as an alkyl chain is used. Examples of such a non-ionic surfactant include a non-ionic surfactant having a polyethylene glycol structure represented by a polyoxyethylene alkyl ether type.

Regarding such a non-ionic surfactant, a polyoxyethylene alkyl ether represented by the following Formula (1) is suitably used.

$$C_nH_{2n}(OCH_2CH_2)_mOH \quad (1)$$

(here, n=12 to 18, m=20 to 100)

Examples of a polyoxyethylene alkyl ether represented by Formula (1) include polyoxyethylene (23) lauryl ether (product name: Brij L23, commercially available from Sigma-Aldrich), polyoxyethylene (20) cetyl ether (product name: Brij C20, commercially available from Sigma-Aldrich), polyoxyethylene (20) stearyl ether (product name: Brij S20, commercially available from Sigma-Aldrich), polyoxyethylene (20) oleyl ether (product name: Brij O20, commercially available from Sigma-Aldrich), and polyoxyethylene (100) stearyl ether (product name: Brij S100, commercially available from Sigma-Aldrich).

Regarding the non-ionic surfactant, polyoxyethylene sorbitan monostearate (molecular formula: $C_{64}H_{126}O_{26}$, product name: Tween 60, commercially available from Sigma-Aldrich), polyoxyethylene sorbitan trioleate (molecular formula: $C_{24}H_{44}O_6$, product name: Tween 85, commercially available from Sigma-Aldrich), octylphenol ethoxylate (molecular formula: $C_{14}H_{22}O(C_2H_4O)_n$, n=1 to 10, product name: Triton X-100, commercially available from Sigma-Aldrich), polyoxyethylene (40) isooctyl phenyl ether (molecular formula: $C_8H_{17}C_6H_4O(CH_2CH_{2O})_{40}H$, product name: Triton X-405, commercially available from Sigma-Aldrich), poloxamer (molecular formula: $C_5H_{10}O_2$, product name: Pluronic, commercially available from Sigma-Aldrich), and polyvinyl pyrrolidone (molecular formula: $(C_6H_9NO)_n$, n=5 to 100, commercially available from Sigma-Aldrich) or the like can be used.

The amount of the non-ionic surfactant in the single-walled carbon nanotube dispersion liquid is preferably 0.1 wt % or more and 5 wt % or less and more preferably 0.5 wt % or more and 2 wt % or less.

When the amount of the non-ionic surfactant is 5 wt % or less, the viscosity of the single-walled carbon nanotube dispersion liquid does not become too high, metallic single-walled carbon nanotubes and semiconducting single-walled carbon nanotubes contained in the single-walled carbon nanotube dispersion liquid can be easily separated through electrophoresis.

The amount of single-walled carbon nanotubes in the single-walled carbon nanotube dispersion liquid is preferably 1 μg/mL or more and 100 μg/mL or less and more preferably 5 μg/mL or more and 40 μg/mL or less.

When the amount of single-walled carbon nanotubes is within the above range, metallic single-walled carbon nanotubes and semiconducting single-walled carbon nanotubes contained in the single-walled carbon nanotube dispersion liquid can be easily separated through electrophoresis.

A method of preparing a single-walled carbon nanotube dispersion liquid is not particularly limited, and a known method is used. For example, a method in which a mixed solution of a dispersion medium containing a mixture of single-walled carbon nanotubes and a surfactant is subjected to an ultrasonic treatment and the mixture of single-walled carbon nanotubes is dispersed in the dispersion medium is an exemplary example. According to this ultrasonic treatment, the aggregated metallic single-walled carbon nanotubes and semiconducting single-walled carbon nanotubes are sufficiently separated, and in the single-walled carbon nanotube dispersion liquid, metallic single-walled carbon nanotubes and semiconducting single-walled carbon nanotubes are uniformly dispersed in the dispersion medium. Thereby, metallic single-walled carbon nanotubes and semiconducting single-walled carbon nanotubes are easily separated through electrophoresis to be described below. Here, metallic single-walled carbon nanotubes and semiconducting single-walled carbon nanotubes that are not dispersed according to an ultrasonic treatment are preferably removed by separation through ultracentrifugation.

Next, in the injection step, the single-walled carbon nanotube dispersion liquid is injected into the separation tank 11 (ST2).

Next, when a direct current voltage is applied to the first electrode 12 and the second electrode 13 for a predetermined time (for example, 1 hour to 100 hours) (ST3), an electric field is formed in the separation tank 11. Specifically, the electric field is formed so that the direction of the electric field is directed from the bottom of the separation tank 11 upward. Due to an electrophoretic force generated by the electric field and the charge of single-walled carbon nanotubes, metallic single-walled carbon nanotubes contained in the single-walled carbon nanotube dispersion liquid move toward the first electrode 12, and semiconducting single-walled carbon nanotubes move toward the second electrode 13. As described above, the mixture is separated into metallic single-walled carbon nanotubes and semiconducting single-walled carbon nanotubes through electrophoresis (ST4).

Figure 5:
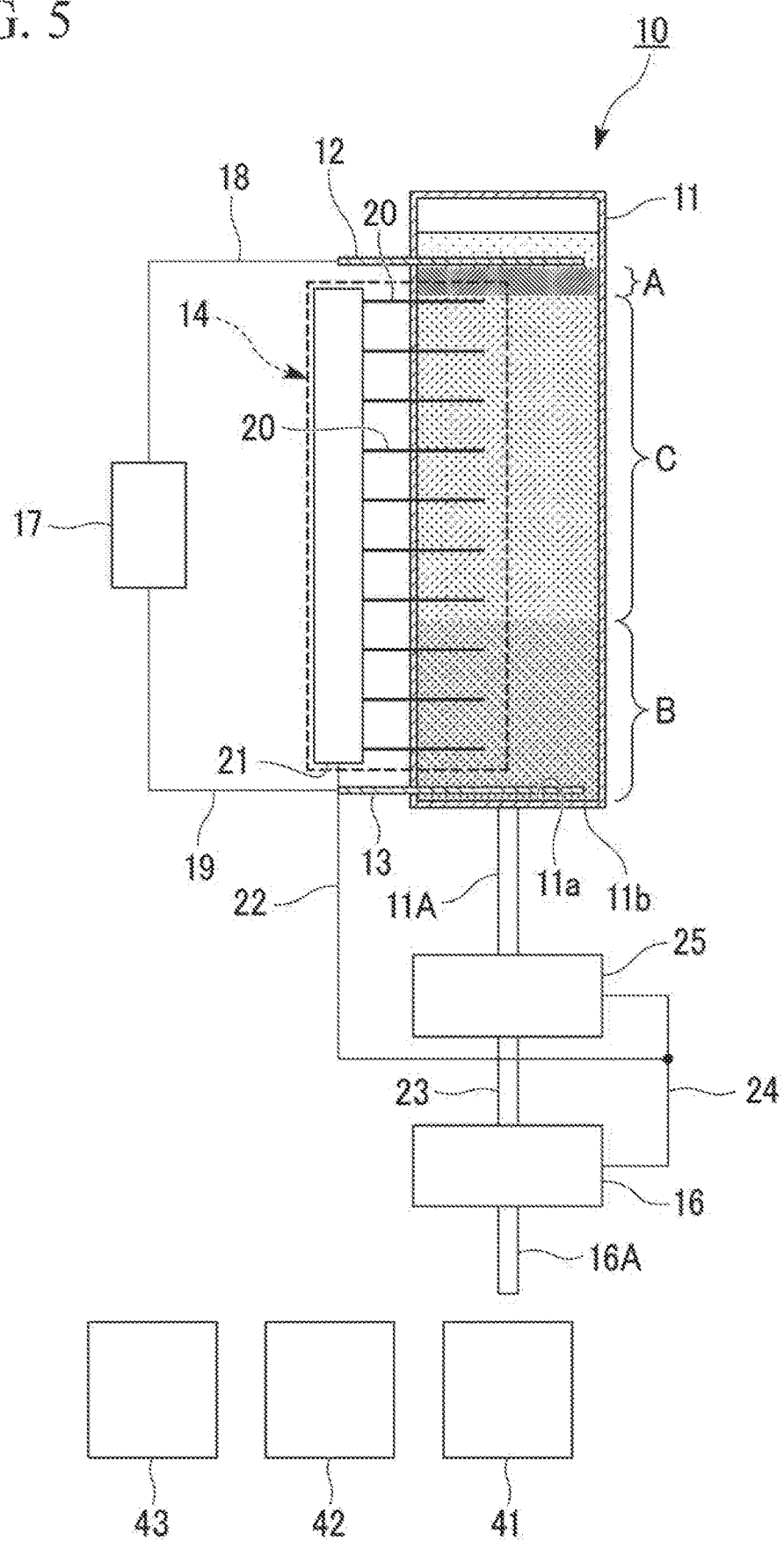
FIG. 5 is a schematic view showing a nanocarbon separation method of the second example embodiment.
Figure 6:
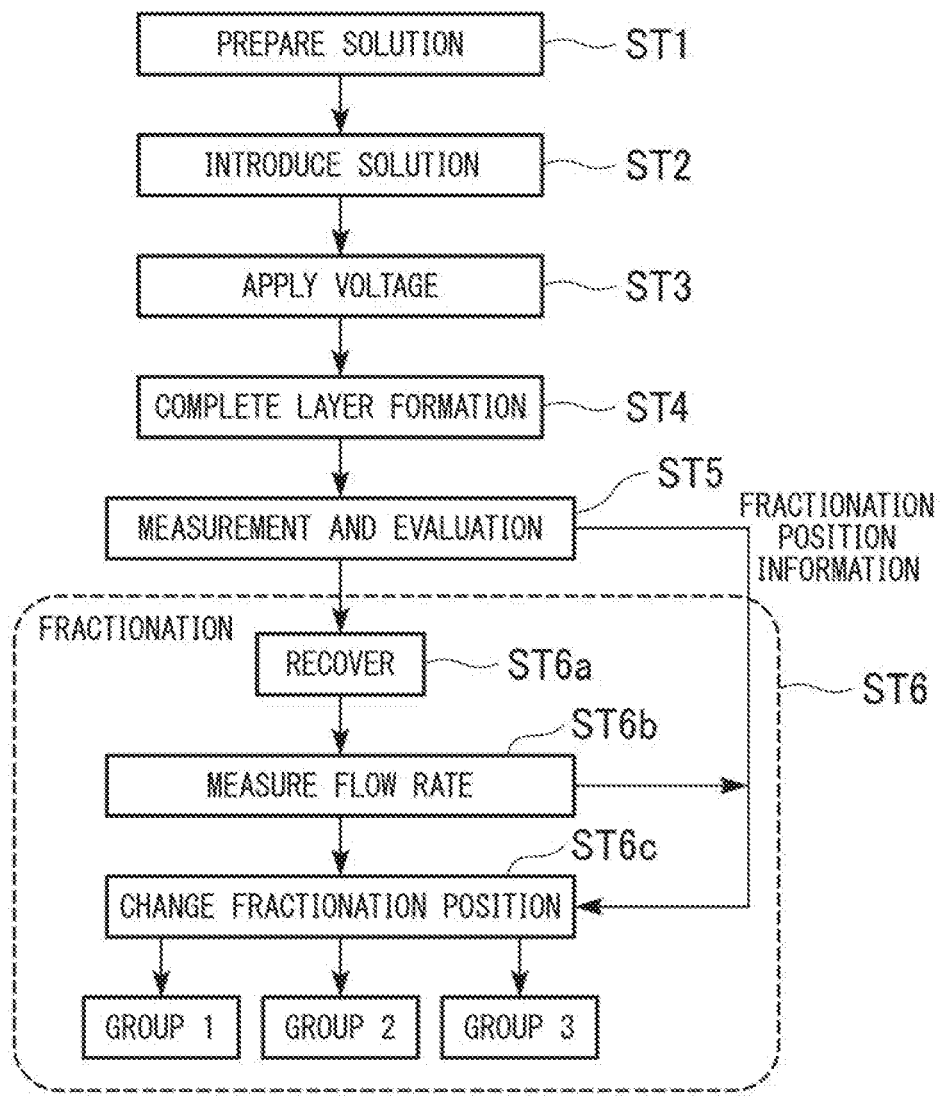
FIG. 6 is a flowchart showing the nanocarbon separation method of the second example embodiment.

Based on the result of electrophoresis, as shown in FIG. 5, the phase of the single-walled carbon nanotube dispersion liquid is separated into three phases including a dispersion liquid phase having a relatively large amount of metallic single-walled carbon nanotubes (hereinafter referred to as a "dispersion liquid phase A"), a dispersion liquid phase having a relatively large amount of semiconducting single-walled carbon nanotubes (hereinafter referred to as a "dispersion liquid phase B"), and a dispersion liquid phase which is formed between the dispersion liquid phase A and the dispersion liquid phase B and has a relatively small amount of metallic single-walled carbon nanotubes and semiconducting single-walled carbon nanotubes (hereinafter referred to as a "dispersion liquid phase C").

In the present example embodiment, the dispersion liquid phase A is formed on the side of the first electrode 12, and the dispersion liquid phase B is formed on the side of the second electrode 13.

A direct current voltage applied to the first electrode 12 and the second electrode 13 is not particularly limited, and is appropriately adjusted according to a distance between the first electrode 12 and the second electrode 13, the amount of the mixture of single-walled carbon nanotubes in the single-walled carbon nanotube dispersion liquid, or the like.

When water or heavy water is used as the dispersion medium of the single-walled carbon nanotube dispersion liquid, a direct current voltage applied to the first electrode 12 and the second electrode 13 has any value that is larger than 0 V and equal to or less than 1,000 V.

In addition, when a direct current voltage is applied to the first electrode 12 and the second electrode 13, the electric field between the first electrode 12 and the second electrode 13 is preferably 0.5 V/cm or more and 15 V/cm or less and more preferably 1 V/cm or more and 10 V/cm or less.

In the separation step, the temperature of the single-walled carbon nanotube dispersion liquid accommodated in the separation tank 11 is not particularly limited as long as it is a temperature at which the dispersion medium of the single-walled carbon nanotube dispersion liquid does not deteriorate or evaporate.

Next, the evaluation means 14 evaluates a physical state or chemical state of the single-walled carbon nanotube dispersion liquid (ST5).

In the nanocarbon separation method of the present example embodiment, a direct current voltage is applied between the first electrode 12 and the second electrode 13, and as the separation proceeds, the distribution of the potential (potential distribution) at each position in the separation tank 11 changes according to the distribution of semiconducting single-walled carbon nanotubes and metallic single-walled carbon nanotubes. Therefore, when the separation is completed, a potential distribution in the separation tank 11 when the separation is completed is measured using the evaluation means 14 including the measurement devices 20 which are a plurality of electrodes arranged in the height direction of the separation tank 11 and the evaluation device 21 that measures a potential of the measurement devices 20, and thus it is possible to evaluate the separation state of the single-walled carbon nanotube dispersion liquid. Here, a separation state of the single-walled carbon nanotube dispersion liquid in the separation tank 11 from when the separation starts may be evaluated using the evaluation means 14, and completion of the separation may be determined.

Next, the fractionation step (ST6) is performed. In the fractionation step, first, the single-walled carbon nanotube dispersion liquid is recovered from the separation tank 11 through the recovery port 11A (ST6a).

The flow rate of the single-walled carbon nanotube dispersion liquid recovered through the recovery port 11A is measured by the flowmeter 25 (ST6b).

Next, in the fractionation step, based on the potential distribution obtained in the evaluation means 14 and the flow rate obtained in the flowmeter 25, the single-walled carbon nanotube dispersion liquid is fractionated (ST6c). That is, in the fractionation step, based on the potential distribution of the single-walled carbon nanotube dispersion liquid obtained in the evaluation means 14 and the flow rate of the single-walled carbon nanotube dispersion liquid that flows through the flow path obtained in the flowmeter 25, single-walled carbon nanotube dispersion liquids having different amounts of metallic single-walled carbon nanotubes and semiconducting single-walled carbon nanotubes are separately recovered (fractionated) in the recovery tanks 41, 42, and 43.

In the fractionation step, for example, according to respective physical states or chemical states of the dispersion liquid phase A having a relatively large amount of metallic single-walled carbon nanotubes, the dispersion liquid phase B having a relatively large amount of semiconducting single-walled carbon nanotubes, and the dispersion liquid phase C having a relatively small amount of metallic single-walled carbon nanotubes and semiconducting single-walled carbon nanotubes, the single-walled carbon nanotube dispersion liquid is separately recovered (fractionated) in the recovery tanks 41, 42, and 43.

Here, fractionation (ST6) shown in FIG. 6 includes ST6a, ST6b and ST6c.

According to the nanocarbon separation method using the nanocarbon separation device 10 of the present example embodiment, without depending on a method of visually confirming that a dispersion liquid phase has been formed or a time for which a direct current voltage is applied between a pair of electrodes, based on the potential distribution of the single-walled carbon nanotube dispersion liquid in a physical state or chemical state obtained in the evaluation step and the flow rate of the single-walled carbon nanotube dispersion liquid that has flowed through the flow path, the separation state of metallic single-walled carbon nanotubes and semiconducting single-walled carbon nanotubes contained in the single-walled carbon nanotube dispersion liquid can be evaluated and fractionated. Therefore, in a step of fractionating the single-walled carbon nanotube dispersion liquid, it is possible to fractionate the separated single-walled carbon nanotubes with stable quality. In addition, since fractionation is performed according to the separation state, highly pure metallic single-walled carbon nanotubes and semiconducting single-walled carbon nanotubes can be fractionated and obtained.

Here, while a case in which a mixture of single-walled carbon nanotubes is separated into metallic single-walled carbon nanotubes and semiconducting single-walled carbon nanotubes has been provided as an exemplary example of the nanocarbon separation method using the nanocarbon separation device 10 of the present example embodiment, the nanocarbon separation method of the present example embodiment is not limited thereto. In the nanocarbon separation method of the present example embodiment, for example, a single-walled carbon nanotube purifying method in which the mixture is separated into metallic single-walled carbon nanotubes and semiconducting single-walled carbon nanotubes in the separation tank 11, and only single-walled carbon nanotubes having desired properties are then recovered may be performed.

Third Example Embodiment (Nanocarbon Separation Device)

Figure 7:
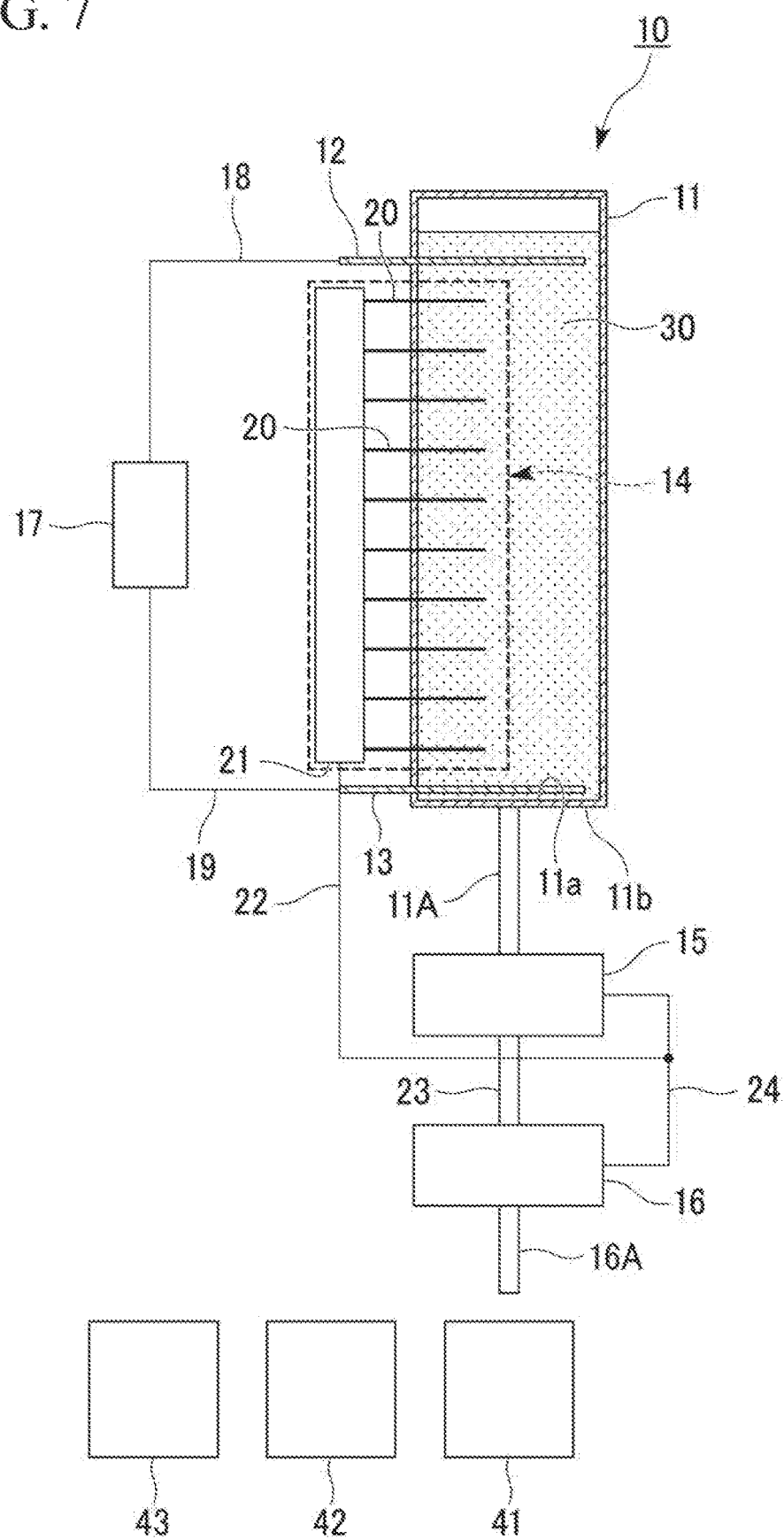
FIG. 7 is a schematic view showing a nanocarbon separation device of a third example embodiment.

FIG. 7 is a schematic view showing a nanocarbon separation device of the present example embodiment.

The nanocarbon separation device 10 of the present example embodiment includes a separation tank (electrophoresis tank) 11 in which the nanocarbon dispersion liquid 30 is accommodated, the first electrode 12 provided at an upper part in the separation tank 11, the second electrode 13 provided at a lower part in the separation tank 11, the first evaluation means 14 that evaluates a physical state or chemical state of the nanocarbon dispersion liquid 30 in the separation tank 11, the recovery port 11A through which a solution is recovered from the separation tank 11, the second evaluation means 15 that evaluates a physical state or chemical state of the nanocarbon dispersion liquid 30 during recovery which is attached to connect the recovery port 11A to the flow path 23, and the fractionation means 16 which is attached to the termination of the flow path 23 and fractionates the nanocarbon dispersion liquid 30 based on the physical state or chemical state of the nanocarbon dispersion liquid 30 evaluated by the first evaluation means 14 and the second evaluation means 15. In addition, the nanocarbon separation device 10 of the present example embodiment includes the direct current power supply 17 that applies a direct current voltage between the first electrode 12 and the second electrode 13. The direct current power supply 17 is electrically connected to the first electrode 12 via the cable 18 and is electrically connected to the second electrode 13 via the cable 19.

In the present example embodiment, fractionation of the nanocarbon dispersion liquid 30 means that, for example, the dispersion liquid 30 having a relatively large amount of metallic nanocarbons and the nanocarbon dispersion liquid 30 having a relatively large amount of semiconducting nanocarbons are separately recovered (fractionated).

(Separation Tank Structure)

In the separation tank 11, the nanocarbon dispersion liquid 30 to be separated is accommodated, and nanocarbons dispersed in the accommodated nanocarbon dispersion liquid 30 are separated through electrophoresis. The shape and size of the separation tank 11 are not particularly limited as long as the separation tank 11 can accommodate the nanocarbon dispersion liquid 30.

The material of the separation tank 11 is not particularly limited as long as it is stable with respect to the nanocarbon dispersion liquid 30 and is an insulating material. Examples of materials of the separation tank 11 include glass, quartz, and acrylic resin.

The separation tank 11 has the recovery port 11A that communicates with the outer bottom surface 11b of the separation tank 11 at the lower end. The recovery port 11A is connected to the second evaluation means 15. In addition, the recovery port 11A has a closed structure (not shown) such as a rotary cock having a ground glass joint.

In the separation tank 11, the first electrode 12 and the second electrode 13 are provided. The first electrode 12 is disposed at an upper part in the separation tank 11 so that it is immersed in or in contact with the nanocarbon dispersion liquid 30. The second electrode 13 is disposed at a lower part in the separation tank 11 so that it is immersed in or in contact with the nanocarbon dispersion liquid 30.

The material of the first electrode 12 and the second electrode 13 is not particularly limited as long as it can be used for electrophoresis and is stable with respect to the nanocarbon dispersion liquid 30. Examples of the first electrode 12 and the second electrode 13 include a platinum electrode.

The structures of the first electrode 12 and the second electrode 13 are not particularly limited, and in the separation tank 11, are appropriately selected according to the amount (volume) of the nanocarbon dispersion liquid 30 accommodated in the separation tank 11 or the like. Examples of structures of the first electrode 12 and the second electrode 13 include an annular shape, a disk shape, and a rod shape in a plan view of the separation tank 11. In addition, examples of structures of the first electrode 12 and the second electrode 13 include a porous plate shape in which a plurality of fine pores are uniformly provided.

(First Evaluation Means)

The first evaluation means 14 that evaluates a physical state or chemical state of the nanocarbon dispersion liquid 30 is attached to the separation tank 11.

The first evaluation means 14 evaluates a physical state or chemical state of the nanocarbon dispersion liquid 30 in the separation tank 11. The first evaluation means 14 includes the plurality of measurement devices 20 and the evaluation device 21 that is electrically connected to the measurement devices 20.

The measurement device 20 in the present example embodiment is an electrode that measures a potential of the nanocarbon dispersion liquid 30 when a voltage is applied to a first electrode and a second electrode in the separation tank 11.

The measurement device 20 is not particularly limited as long as it does not influence electrophoresis and is stable with respect to the nanocarbon dispersion liquid 30. Examples of the measurement device 20 include a platinum electrode.

The structure of the measurement device 20 is not particularly limited as long as it is a structure that does not restrict movement of metallic nanocarbons and semiconducting nanocarbons contained in the nanocarbon dispersion liquid 30 in the separation tank 11 and is in contact with the nanocarbon dispersion liquid 30.

The measurement device 20 is attached so that an evaluation position in the separation tank 11 can be recognized. The interval at which the plurality of measurement devices 20 are arranged is not particularly limited, and is appropriately adjusted according to the height of the separation tank 11, the amount (volume) of the nanocarbon dispersion liquid 30 accommodated in the separation tank 11, or the like.

While a case in which a potential of the nanocarbon dispersion liquid 30 when a voltage is applied to a first electrode and a second electrode in the separation tank 11 is measured has been provided as an exemplary example of the first evaluation means 14 in the present example embodiment, the first evaluation means 14 is not limited thereto as long as it measures a physical state or chemical state of the nanocarbon dispersion liquid 30 at each position in the separation tank 11. Examples of physical states or chemical states of the nanocarbon dispersion liquid 30 to be measured by the measurement device 20 include the pH of the nanocarbon dispersion liquid 30, the absorbance of the nanocarbon dispersion liquid 30, the emission spectrum of the nanocarbon dispersion liquid 30, the refractive index of the nanocarbon dispersion liquid 30, and the conductivity of the nanocarbon dispersion liquid 30.

The evaluation device 21 is electrically connected to the cable 24 that electrically connects the second evaluation means 15 and the fractionation means 16 via the cable 22. The evaluation device 21 can convert the measurement result obtained from the electrically connected measurement device 20 into an electrical signal and output it to the fractionation means 16.

(Second Evaluation Means)

The second evaluation means 15 is attached to the recovery port 11A. The second evaluation means 15 measures and evaluates a physical state or chemical state of the nanocarbon dispersion liquid 30 that passes through the recovery path 11A. The second evaluation means 15 is connected to the fractionation means 16 via the cable 24. The second evaluation means 15 in the present example embodiment measures and evaluates an optical absorption spectrum of the nanocarbon dispersion liquid 30 in the flow path.

While a case in which the second evaluation means 15 measures an optical absorption spectrum of the nanocarbon dispersion liquid 30 in the flow path has been provided as an exemplary example of the present example embodiment, the second evaluation means 15 is not limited thereto as long as it measures a physical state or chemical state of the nanocarbon dispersion liquid 30. Examples of physical states or chemical states of the nanocarbon dispersion liquid 30 to be measured include the pH of the nanocarbon dispersion liquid 30, the emission spectrum of the nanocarbon dispersion liquid 30, the refractive index of the nanocarbon dispersion liquid 30, and the conductivity of the nanocarbon dispersion liquid 30.

(Fractionation Means)

The fractionation means 16 fractionates the nanocarbon dispersion liquid 30 based on the physical state or chemical state of the nanocarbon dispersion liquid 30 evaluated by the first evaluation means 14 and the second evaluation means 15.

The fractionation means 16 can be moved according to the positions of recovery tanks 41, 42, and 43. Therefore, the fractionation means 16 separately recovers (fractionates) the nanocarbon dispersion liquid 30 in the recovery tanks 41, 42, and 43 according to the amount of metallic nanocarbons and semiconducting nanocarbons in the nanocarbon dispersion liquid 30. In addition, the fractionation means 16 has a drain port 16A. The fractionation means 16 injects the nanocarbon dispersion liquid 30 into the recovery tanks 41, 42, and 43 through the drain port 16A.

(Nanocarbon Separation Method)

Figure 8:
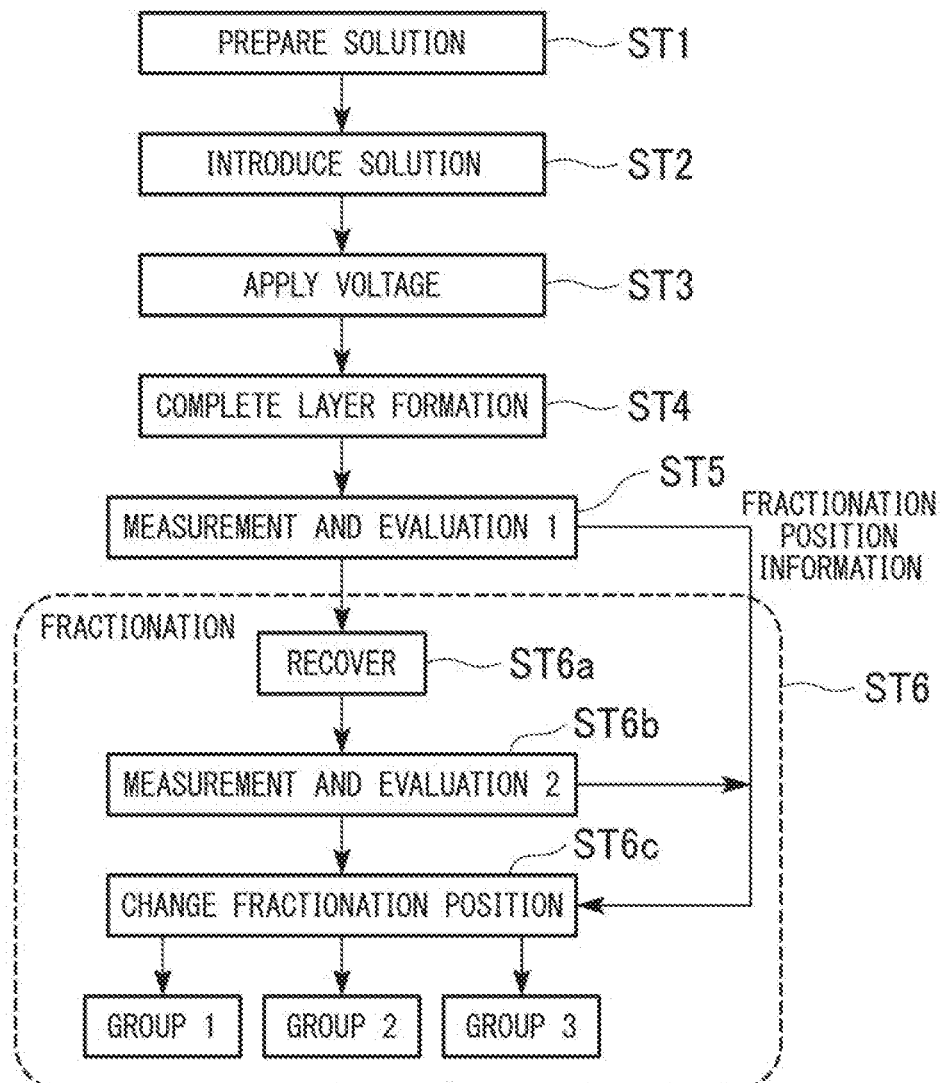
FIG. 8 is a schematic view showing a nanocarbon separation method of the third example embodiment.
Figure 9:
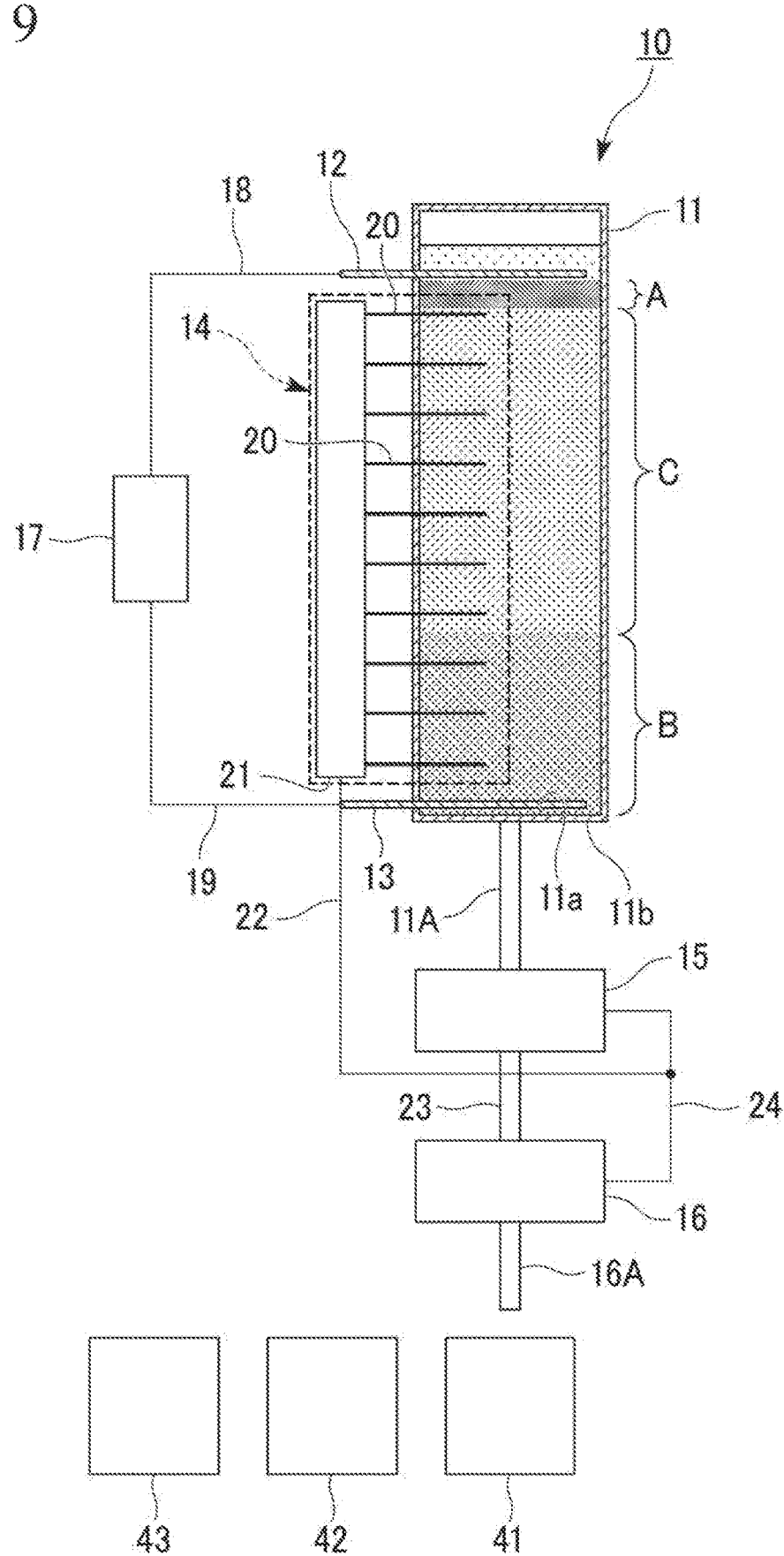
FIG. 9 is a flowchart showing the nanocarbon separation method of the third example embodiment.

A nanocarbon separation method using the nanocarbon separation device 10 will be described and also operations of the nanocarbon separation device 10 will be described with reference to FIG. 7 to FIG. 9. FIG. 8 is a flowchart showing a nanocarbon separation method of the present example embodiment.

The nanocarbon separation method of the present example embodiment includes a step of injecting the nanocarbon dispersion liquid 30 into the separation tank 11 (hereinafter referred to as an "injection step"), a step in which a direct current voltage is applied between the first electrode 12 provided at an upper part in the separation tank 11 and the second electrode 13 provided at a lower part in the separation tank 11, metallic nanocarbons contained in the nanocarbon dispersion liquid 30 are caused to move toward the first electrode 12, semiconducting nanocarbons contained in the nanocarbon dispersion liquid 30 are caused to move toward the second electrode 13, and the metallic nanocarbons and the semiconducting nanocarbons are separated (hereinafter referred to as a "separation step"), a step of evaluating a physical state or chemical state of the nanocarbon dispersion liquid 30 (hereinafter referred to as an "evaluation step"), and a step of fractionating the nanocarbon dispersion liquid 30 based on the physical state or chemical state of the nanocarbon dispersion liquid 30 (hereinafter referred to as a "fractionation step").

In the nanocarbon separation method of the present example embodiment, the nanocarbon refers to a carbon material mainly composed of carbon such as single-walled carbon nanotubes, double-walled carbon nanotubes, multi-walled carbon nanotubes, carbon nanohorns, carbon nanotwists, graphene, fullerene, and the like. In the nanocarbon separation method of the present example embodiment, a case in which semiconducting single-walled carbon nanotubes and metallic single-walled carbon nanotubes are separated from a dispersion liquid in which single-walled carbon nanotubes as nanocarbons are dispersed will be described in detail.

It is known that single-walled carbon nanotubes are divided into a metallic type and a semiconducting type with two different properties according to the diameter of the tube and a winding configuration. When single-walled carbon nanotubes are synthesized using a conventional production method, a mixture of single-walled carbon nanotubes including metallic single-walled carbon nanotubes having metallic properties and semiconducting single-walled carbon nanotubes having semiconducting properties at a statistical ratio of 1:2 is obtained.

The mixture of single-walled carbon nanotubes is not particularly limited as long as it contains metallic single-walled carbon nanotubes and semiconducting single-walled carbon nanotubes. In addition, the single-walled carbon nanotubes in the present example embodiment may be single-walled carbon nanotubes alone or single-walled carbon nanotubes in which some of carbon atoms are substituted with an arbitrary functional group or single-walled carbon nanotubes that are modified with an arbitrary functional group.

First, a single-walled carbon nanotube dispersion liquid in which a mixture of single-walled carbon nanotubes is dispersed in a dispersion medium together with a surfactant is prepared (ST1).

The dispersion medium is not particularly limited as long as it allows the mixture of single-walled carbon nanotubes to be dispersed. Examples of dispersion mediums include water, heavy water, an organic solvent, and an ionic liquid. Among these dispersion mediums, water or heavy water is suitably used because single-walled carbon nanotubes do not deteriorate.

Regarding the surfactant, a non-ionic surfactant, a cationic surfactant, an anionic surfactant and the like are used. A non-ionic surfactant is preferably used in order to prevent ionic impurities such as sodium ions from being mixed into single-walled carbon nanotubes.

Regarding the non-ionic surfactant, a non-ionic surfactant having a non-ionizable hydrophilic moiety and a hydrophobic moiety such as an alkyl chain is used. Examples of such a non-ionic surfactant include a non-ionic surfactant having a polyethylene glycol structure represented by a polyoxyethylene alkyl ether type.

Regarding such a non-ionic surfactant, a polyoxyethylene alkyl ether represented by the following Formula (1) is suitably used.

$$CH_nH_{2n}(OCH_2CH_2)_mOH \qquad (1)$$

(here, n=12 to 18, m=20 to 100)

Examples of a polyoxyethylene alkyl ether represented by Formula (1) include polyoxyethylene (23) lauryl ether (product name: Brij L23, commercially available from Sigma-Aldrich), polyoxyethylene (20) cetyl ether (product name: Brij C20, commercially available from Sigma-Aldrich), polyoxyethylene (20) stearyl ether (product name: Brij S20, commercially available from Sigma-Aldrich), polyoxyethylene (20) oleyl ether (product name: Brij O20, commercially available from Sigma-Aldrich), and polyoxyethylene (100) stearyl ether (product name: Brij S100, commercially available from Sigma-Aldrich).

Regarding the non-ionic surfactant, polyoxyethylene sorbitan monostearate (molecular formula: $C_{64}H_{126}O_{26}$, product name: Tween 60, commercially available from Sigma-Aldrich), polyoxyethylene sorbitan trioleate (molecular formula: $C_{24}H_{44}O_6$, product name: Tween 85, commercially available from Sigma-Aldrich), octylphenol ethoxylate (molecular formula: $C_{14}H_{22}O(C_2H_4O)_n$, n=1 to 10, product name: Triton X-100, commercially available from Sigma-Aldrich), polyoxyethylene (40) isooctyl phenyl ether (molecular formula: $C_8H_{17}C_6H_4O(CH_2CH_{20})_{40}H$, product name: Triton X-405, commercially available from Sigma-Aldrich), poloxamer (molecular formula: $C_5H_{10}O_2$, product name: Pluronic, commercially available from Sigma-Aldrich), and polyvinyl pyrrolidone (molecular formula: $(C_6H_9NO)_n$, n=5 to 100, commercially available from Sigma-Aldrich) or the like can be used.

The amount of the non-ionic surfactant in the single-walled carbon nanotube dispersion liquid is preferably 0.1 wt % or more and 5 wt % or less and more preferably 0.5 wt % or more and 2 wt % or less.

When the amount of the non-ionic surfactant is 5 wt % or less, the viscosity of the single-walled carbon nanotube dispersion liquid does not become too high, metallic single-walled carbon nanotubes and semiconducting single-walled carbon nanotubes contained in the single-walled carbon nanotube dispersion liquid can be easily separated through electrophoresis.

The amount of single-walled carbon nanotubes in the single-walled carbon nanotube dispersion liquid is preferably 1 μg/mL or more and 100 μg/mL or less and more preferably 5 μg/mL or more and 40 μg/mL or less.

When the amount of single-walled carbon nanotubes is within the above range, metallic single-walled carbon nanotubes and semiconducting single-walled carbon nanotubes contained in the single-walled carbon nanotube dispersion liquid can be easily separated through electrophoresis.

A method of preparing a single-walled carbon nanotube dispersion liquid is not particularly limited, and a known method is used. For example, a method in which a mixed solution of a dispersion medium containing a mixture of single-walled carbon nanotubes and a surfactant is subjected to an ultrasonic treatment and the mixture of single-walled carbon nanotubes is dispersed in the dispersion medium is an exemplary example. According to this ultrasonic treatment, the aggregated metallic single-walled carbon nanotubes and semiconducting single-walled carbon nanotubes are sufficiently separated and in the nanocarbon dispersion liquid, metallic single-walled carbon nanotubes and semiconducting single-walled carbon nanotubes are uniformly dispersed in the dispersion medium. Thereby, metallic single-walled carbon nanotubes and semiconducting single-walled carbon nanotubes are easily separated through electrophoresis to be described below. Here, metallic single-walled carbon nanotubes and semiconducting single-walled carbon nanotubes that are not dispersed according to an ultrasonic treatment are preferably removed by separation through ultracentrifugation.

Next, in the injection step, the single-walled carbon nanotube dispersion liquid is injected into the separation tank 11 (ST2).

Next, when a direct current voltage is applied to the first electrode 12 and the second electrode 13 for a predetermined time (for example, 1 hour to 100 hours) (ST3), an electric field is formed in the separation tank 11. Specifically, the electric field is formed so that the direction of the electric field is directed from the bottom of the separation tank 11 upward. Due to an electrophoretic force generated by the electric field and the charge of single-walled carbon nanotubes, metallic single-walled carbon nanotubes contained in the single-walled carbon nanotube dispersion liquid move toward the first electrode 12, and semiconducting single-walled carbon nanotubes move toward the second electrode 13. As described above, the mixture is separated into metallic single-walled carbon nanotubes and semiconducting single-walled carbon nanotubes through electrophoresis (ST4).

Based on the result of electrophoresis, as shown in FIG. 8, the phase of the single-walled carbon nanotube dispersion liquid is separated into three phases including a dispersion liquid phase having a relatively large amount of metallic single-walled carbon nanotubes (hereinafter referred to as a "dispersion liquid phase A"), a dispersion liquid phase having a relatively large amount of semiconducting single-walled carbon nanotubes (hereinafter referred to as a "dispersion liquid phase B"), and a dispersion liquid phase which is formed between the dispersion liquid phase A and the dispersion liquid phase B and has a relatively small amount of metallic single-walled carbon nanotubes and semiconducting single-walled carbon nanotubes (hereinafter referred to as a "dispersion liquid phase C").

In the present example embodiment, the dispersion liquid phase A is formed on the side of the first electrode 12, and the dispersion liquid phase B is formed on the side of the second electrode 13.

A direct current voltage applied to the first electrode 12 and the second electrode 13 is not particularly limited, and is appropriately adjusted according to a distance between the first electrode 12 and the second electrode 13, the amount of the mixture of single-walled carbon nanotubes in the single-walled carbon nanotube dispersion liquid, or the like.

When water or heavy water is used as the dispersion medium of the single-walled carbon nanotube dispersion liquid, a direct current voltage applied to the first electrode 12 and the second electrode 13 has any value that is larger than 0 V and equal to or less than 1,000 V.

In addition, when a direct current voltage is applied to the first electrode 12 and the second electrode 13, the electric field between the first electrode 12 and the second electrode 13 is preferably 0.5 V/cm or more and 15 V/cm or less and more preferably 1 V/cm or more and 10 V/cm or less.

In the separation step, the temperature of the single-walled carbon nanotube dispersion liquid accommodated in the separation tank 11 is not particularly limited as long as it is a temperature at which the dispersion medium of the single-walled carbon nanotube dispersion liquid does not deteriorate or evaporate.

Next, the first evaluation means 14 evaluates a physical state or chemical state of the single-walled carbon nanotube dispersion liquid (ST5).

In the nanocarbon separation method of the present example embodiment, a direct current voltage is applied between the first electrode 12 and the second electrode 13, and as the separation proceeds, the distribution of the potential (potential distribution) at positions in the separation tank 11 changes according to the distribution of semiconducting single-walled carbon nanotubes and metallic single-walled carbon nanotubes. Therefore, when the separation is completed, a potential distribution in the separation tank 11 when the separation is completed is measured using the first evaluation means 14 including the measurement devices 20 which are a plurality of electrodes arranged in the height direction of the separation tank 11 and the evaluation device 21 that measures a potential of the measurement devices 20 and thus it is possible to evaluate the separation state of the single-walled carbon nanotube dispersion liquid.

Next, the fractionation step (ST6) is performed. In the fractionation step, first, the single-walled carbon nanotube dispersion liquid is recovered from the separation tank 11 through the recovery port 11A (ST6a).

Regarding the single-walled carbon nanotube dispersion liquid recovered through the recovery port 11A, the second evaluation means 15 measures and evaluates a physical state and a chemical state of the single-walled carbon nanotube dispersion liquid that passes through the recovery path 11A (ST6b).

In the present example embodiment, in the second evaluation means 15, the optical absorption spectrum of the single-walled carbon nanotube dispersion liquid that passes through the recovery path 11A is measured.

Next, in the fractionation step, based on the potential distribution obtained in the first evaluation means 14 and the optical absorption spectrum obtained in the second evaluation means 15, the single-walled carbon nanotube dispersion liquid is fractionated (ST6c). That is, in the fractionation step, based on the potential distribution of the single-walled carbon nanotube dispersion liquid obtained in the first evaluation means 14 and the optical absorption spectrum of the single-walled carbon nanotube dispersion liquid that flows through the flow path obtained in the second evaluation means 15, single-walled carbon nanotube dispersion liquids having different amounts of metallic single-walled carbon nanotubes and semiconducting single-walled carbon nanotubes are separately recovered (fractionated) in the recovery tanks 41, 42, and 43.

In the fractionation step, for example, according to respective physical states or chemical states of the dispersion liquid phase A having a relatively large amount of metallic single-walled carbon nanotubes, the dispersion liquid phase B having a relatively large amount of semiconducting single-walled carbon nanotubes, and the dispersion liquid phase C having a relatively small amount of metallic single-walled carbon nanotubes and semiconducting single-walled carbon nanotubes, the single-walled carbon nanotube dispersion liquid is separately recovered (fractionated) in the recovery tanks 41, 42, and 43.

Here, fractionation (ST6) shown in FIG. 8 includes ST6a, ST6b and ST6c.

According to the nanocarbon separation method using the nanocarbon separation device 10 of the present example embodiment, without depending on a method of visually confirming that a dispersion liquid phase has been formed or a time for which a direct current voltage is applied between a pair of electrodes, based on the potential distribution of the single-walled carbon nanotube dispersion liquid in a physical state or chemical state obtained in the first evaluation step and the optical absorption spectrum of the single-walled carbon nanotube dispersion liquid obtained in the second evaluation step, the separation state of metallic single-walled carbon nanotubes and semiconducting single-walled carbon nanotubes contained in the single-walled carbon nanotube dispersion liquid can be evaluated in more detail and fractionated. Therefore, in a step of fractionating the single-walled carbon nanotube dispersion liquid, it is possible to fractionate the separated single-walled carbon nanotubes with stable quality. In addition, since fractionation is performed according to the separation state, highly pure metallic single-walled carbon nanotubes and semiconducting single-walled carbon nanotubes can be fractionated and obtained.

Here, while a case in which a mixture of single-walled carbon nanotubes is separated into metallic single-walled carbon nanotubes and semiconducting single-walled carbon nanotubes has been provided as an exemplary example of the nanocarbon separation method using the nanocarbon separation device 10 of the present example embodiment, the nanocarbon separation method of the present example embodiment is not limited thereto. In the nanocarbon separation method of the present example embodiment, for example, a single-walled carbon nanotube purifying method in which the mixture is separated into metallic single-walled carbon nanotubes and semiconducting single-walled carbon nanotubes in the separation tank 11, and only single-walled carbon nanotubes having desired properties are then recovered may be performed.

Fourth Example Embodiment (Nanocarbon Separation Device)

Figure 10:
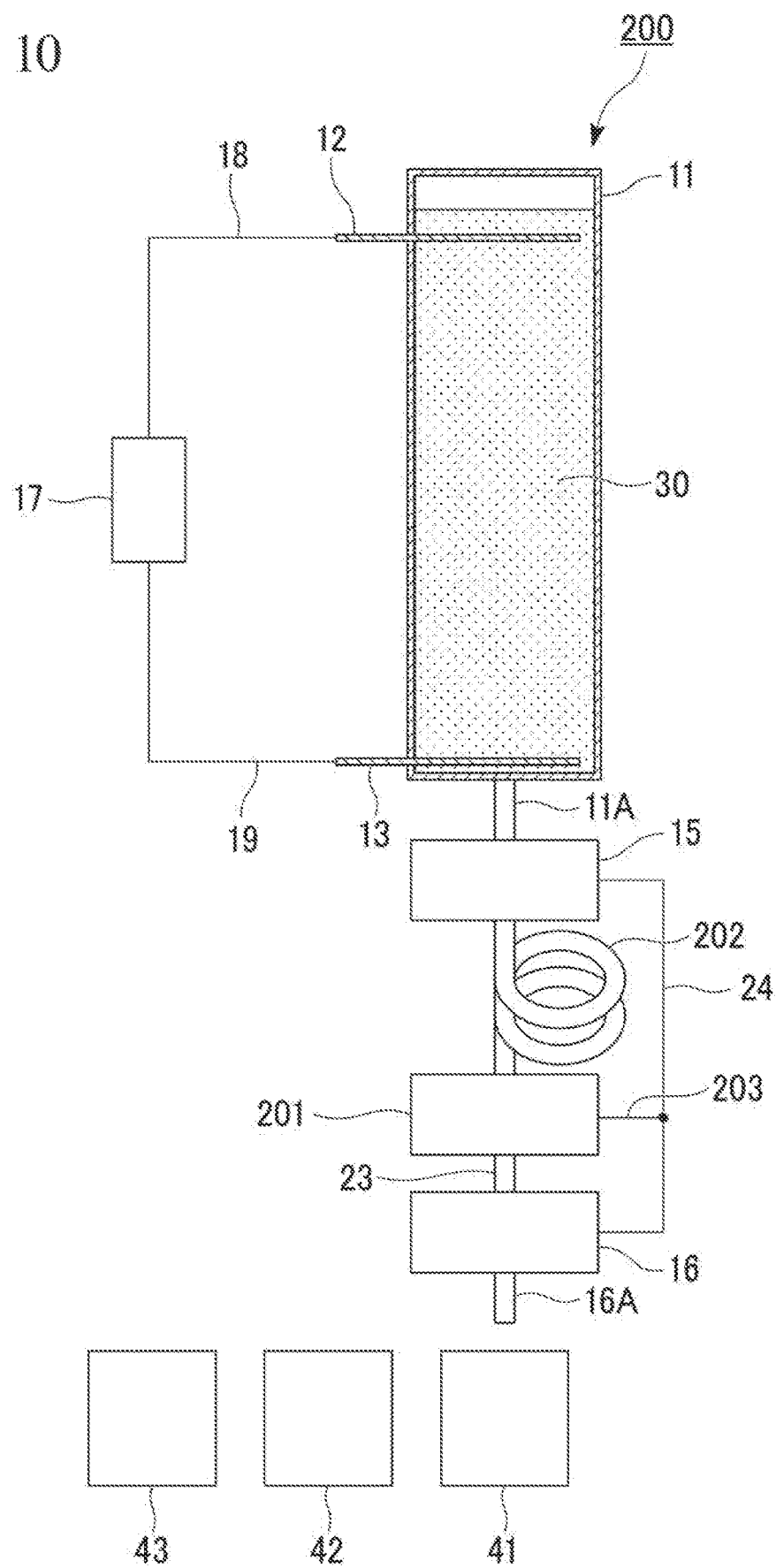
FIG. 10 is a schematic view showing a nanocarbon separation device of a fourth example embodiment.

FIG. 10 is a schematic view showing a nanocarbon separation device of the present example embodiment.

A nanocarbon separation device 200 of the present example embodiment includes a separation tank (electrophoresis tank) 11 in which the nanocarbon dispersion liquid 30 is accommodated, the first electrode 12 provided at an upper part in the separation tank 11, the second electrode 13 provided at a lower part in the separation tank 11, the recovery port 11A through which a solution is recovered from the separation tank 11, the first evaluation means 15 that evaluates a physical state or chemical state of the nanocarbon dispersion liquid 30 during recovery, which is attached to connect the recovery port 11A to a flow path 202, the flow path 202 having a volume equal to or larger than the amount of nanocarbon dispersion liquid in the separation tank 11, a second evaluation means 201 that evaluates a physical state or chemical state of the nanocarbon dispersion liquid 30 during recovery, which is attached to connect the flow path 202 to the flow path 23, and the fractionation means 16 which is attached to the termination of the flow path 23 that fractionates the nanocarbon dispersion liquid 30 based on the physical state or chemical state of the nanocarbon dispersion liquid 30 evaluated by the first evaluation means 15 and the second evaluation means 202. In addition, the nanocarbon separation device 200 of the present example embodiment includes the direct current power supply 17 that applies a direct current voltage between the first electrode 12 and the second electrode 13. The direct current power supply 17 is electrically connected to the first electrode 12 via the cable 18 and is electrically connected to the second electrode 13 via the cable 19.

In the present example embodiment, fractionation of the nanocarbon dispersion liquid 30 means that, for example, the dispersion liquid 30 having a relatively large amount of metallic nanocarbons and the nanocarbon dispersion liquid 30 having a relatively large amount of semiconducting nanocarbons are separately recovered (fractionated).

(Separation Tank Structure)

In the separation tank 11, the nanocarbon dispersion liquid 30 to be separated is accommodated, and nanocarbons dispersed in the accommodated nanocarbon dispersion liquid 30 are separated through electrophoresis. The shape and size of the separation tank 11 are not particularly limited as long as the separation tank 11 can accommodate the nanocarbon dispersion liquid 30.

The material of the separation tank 11 is not particularly limited as long as it is stable with respect to the nanocarbon dispersion liquid 30 and is an insulating material. Examples of materials of the separation tank 11 include glass, quartz, and acrylic resin.

The separation tank 11 has the recovery port 11A that communicates with the outer bottom surface 11b of the separation tank 11 at the lower end. The recovery port 11A is connected to the first evaluation means 15. In addition, the recovery port 11A has a closed structure (not shown) such as a rotary cock having a ground glass joint.

In the separation tank 11, the first electrode 12 and the second electrode 13 are provided. The first electrode 12 is disposed at an upper part in the separation tank 11 so that it is immersed in or in contact with the nanocarbon dispersion liquid 30. The second electrode 13 is disposed at a lower part in the separation tank 11 so that it is immersed in or in contact with the nanocarbon dispersion liquid 30.

The material of the first electrode 12 and the second electrode 13 is not particularly limited as long as it can be used for electrophoresis and is stable with respect to the nanocarbon dispersion liquid 30. Examples of the first electrode 12 and the second electrode 13 include a platinum electrode.

The structures of the first electrode 12 and the second electrode 13 are not particularly limited, and in the separation tank 11, are appropriately selected according to the amount (volume) of the nanocarbon dispersion liquid 30 accommodated in the separation tank 11 or the like. Examples of structures of the first electrode 12 and the second electrode 13 include an annular shape, a disk shape, and a rod shape in a plan view of the separation tank 11. In addition, examples of structures of the first electrode 12 and the second electrode 13 include a porous plate shape in which a plurality of fine pores are uniformly provided.

(First Evaluation Means)

The first evaluation means 15 is attached to the recovery port 11A. The first evaluation means 15 measures and evaluates a physical state or chemical state of the nanocarbon dispersion liquid 30 that passes through the recovery path 11A. The first evaluation means 15 is connected to the fractionation means 16 via the cable 24. The evaluation means 15 in the present example embodiment measures and evaluates an optical absorption spectrum of the nanocarbon dispersion liquid 30 in the flow path.

While a case in which an optical absorption spectrum of the nanocarbon dispersion liquid 30 in the flow path is measured has been provided as an exemplary example of the first evaluation means 15 in the present example embodiment, the first evaluation means 15 is not limited thereto as long as it measures a physical state or chemical state of the nanocarbon dispersion liquid 30. Examples of physical states or chemical states of the nanocarbon dispersion liquid 30 to be measured include the pH of the nanocarbon dispersion liquid 30, the emission spectrum of the nanocarbon dispersion liquid 30, the refractive index of the nanocarbon dispersion liquid 30, and the conductivity of the nanocarbon dispersion liquid 30.

(Flow Path)

The flow path 202 is attached to the first evaluation means 15. The second evaluation means 201 is attached to a rear end of the flow path 202. The flow path 202 has a capacity equal to or larger than the volume of the separation tank 11. The nanocarbon dispersion liquid 30 that has passed through the first evaluation means 15 passes through the flow path 202. Therefore, the nanocarbon dispersion liquid 30 in the separation tank 11 is introduced from the flow path 202 to the second evaluation means 201 after the first evaluation means 15 measures and evaluates a physical state or chemical state of the total amount.

(Second Evaluation Means)

The second evaluation means 201 is attached to the flow path 202. The second evaluation means 201 measures and evaluates a physical state or chemical state of the nanocarbon dispersion liquid 30 that passes therethrough. The second evaluation means 202 is connected to the cable 24 via a cable 203 and is electrically connected to the fractionation means 16. The second evaluation means 201 in the present example embodiment measures and evaluates an optical absorption spectrum of the nanocarbon dispersion liquid 30 in the flow path.

While a case in which an optical absorption spectrum of the nanocarbon dispersion liquid 30 in the flow path is measured has been provided as an exemplary example of the second evaluation means 201 in the present example embodiment, the second evaluation means 201 is not limited thereto as long as it measures a physical state or chemical state of the nanocarbon dispersion liquid 30. Examples of physical states or chemical states of the nanocarbon dispersion liquid 30 to be measured include the pH of the nanocarbon dispersion liquid 30, the emission spectrum of the nanocarbon dispersion liquid 30, the refractive index of the nanocarbon dispersion liquid 30, the conductivity of the nanocarbon dispersion liquid 30, and the amount of the nanocarbon dispersion liquid 30 that has passed.

(Fractionation)

The fractionation means 16 fractionates the nanocarbon dispersion liquid 30 based on the optical absorption spectrums of the nanocarbon dispersion liquid 30 evaluated by the first evaluation means 15 and the second evaluation means 201.

That is, in the fractionation means 16, based on the separation state of the nanocarbon dispersion liquid 30 evaluated from the optical absorption spectrum related to the entire region of the nanocarbon dispersion liquid 30 acquired from the first evaluation means 15, fractionation of the nanocarbon dispersion liquid 30 measured in the second evaluation means 201 is determined from the optical absorption spectrum of the nanocarbon dispersion liquid 30 obtained by the second evaluation means 201.

The fractionation means 16 can be moved according to the positions of recovery tanks 41, 42, and 43. Therefore, the fractionation means 16 separately recovers (fractionates) the nanocarbon dispersion liquid 30 in the recovery tanks 41, 42, and 43 according to the amount of metallic nanocarbons and semiconducting nanocarbons in the nanocarbon dispersion liquid 30. In addition, the fractionation means 16 has a drain port 16A. The fractionation means 16 injects the nanocarbon dispersion liquid 30 into the recovery tanks 41, 42, and 43 through the drain port 16A.

(Nanocarbon Separation Method)

Figure 11:
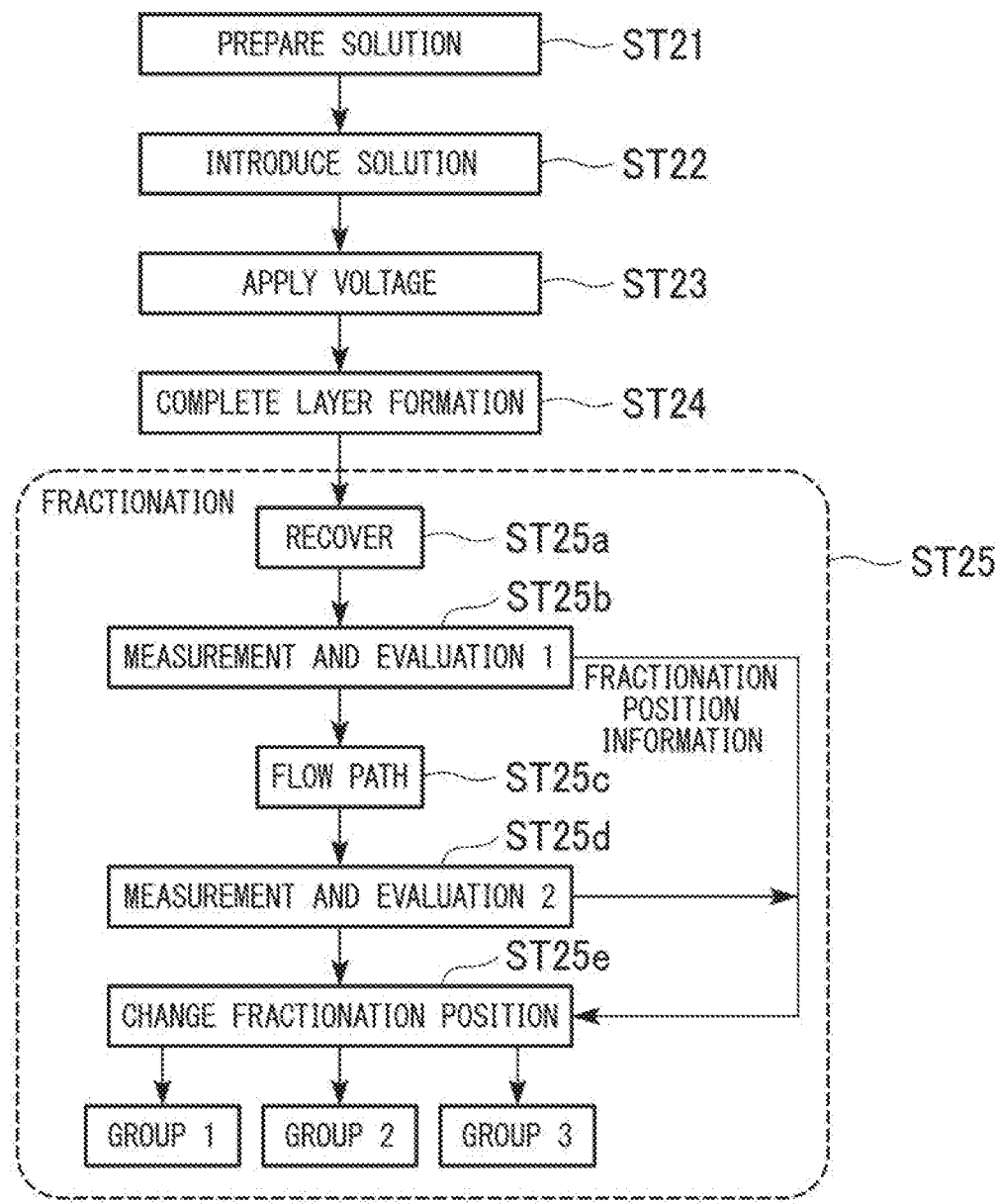
FIG. 11 is a flowchart showing a nanocarbon separation method of the fourth example embodiment.

A nanocarbon separation method using a nanocarbon separation device 200 will be described and also operations of the nanocarbon separation device 200 will be described with reference to FIG. 10 to FIG. 12. FIG. 11 is a flowchart showing a nanocarbon separation method of the present example embodiment.

The nanocarbon separation method of the present example embodiment includes a step of injecting the nanocarbon dispersion liquid 30 into the separation tank 11 (hereinafter referred to as an "injection step"), a step in which a direct current voltage is applied between the first electrode 12 provided at an upper part in the separation tank 11 and the second electrode 13 provided at a lower part in the separation tank 11, metallic nanocarbons contained in the nanocarbon dispersion liquid 30 are caused to move toward the first electrode 12, semiconducting nanocarbons contained in the nanocarbon dispersion liquid 30 are caused to move toward the second electrode 13, and the metallic nanocarbons and the semiconducting nanocarbons are separated (hereinafter referred to as a "separation step"), a step of evaluating a physical state or chemical state of the nanocarbon dispersion liquid 30 (hereinafter referred to as an "evaluation step"), and a step of fractionating the nanocarbon dispersion liquid 30 based on the physical state or chemical state of the nanocarbon dispersion liquid 30 (hereinafter referred to as a "fractionation step").

In the nanocarbon separation method of the present example embodiment, the nanocarbon refers to a carbon material mainly composed of carbon such as single-walled carbon nanotubes, double-walled carbon nanotubes, multi-walled carbon nanotubes, carbon nanohorns, carbon nanotwists, graphene, fullerene, and the like. In the nanocarbon separation method of the present example embodiment, a case in which semiconducting single-walled carbon nanotubes and metallic single-walled carbon nanotubes are separated from a dispersion liquid in which single-walled carbon nanotubes as nanocarbons are dispersed will be described in detail.

It is known that single-walled carbon nanotubes are divided into a metallic type and a semiconducting type with two different properties according to the diameter of the tube and a winding configuration. When single-walled carbon nanotubes are synthesized using a conventional production method, a mixture of single-walled carbon nanotubes including metallic single-walled carbon nanotubes having metallic properties and semiconducting single-walled carbon nanotubes having semiconducting properties at a statistical ratio of 1:2 is obtained.

The mixture of single-walled carbon nanotubes is not particularly limited as long as it contains metallic single-walled carbon nanotubes and semiconducting single-walled carbon nanotubes. In addition, the single-walled carbon nanotubes in the present example embodiment may be single-walled carbon nanotubes alone or single-walled carbon nanotubes in which some of carbon atoms are substituted with an arbitrary functional group or single-walled carbon nanotubes that are modified with an arbitrary functional group.

First, a single-walled carbon nanotube dispersion liquid in which a mixture of single-walled carbon nanotubes is dispersed in a dispersion medium together with a surfactant is prepared (ST21).

The dispersion medium is not particularly limited as long as it allows the mixture of single-walled carbon nanotubes to be dispersed. Examples of dispersion mediums include water, heavy water, an organic solvent, and an ionic liquid. Among these dispersion mediums, water or heavy water is suitably used because single-walled carbon nanotubes do not deteriorate.

Regarding the surfactant, a non-ionic surfactant, a cationic surfactant, an anionic surfactant and the like are used. A non-ionic surfactant is preferably used in order to prevent ionic impurities such as sodium ions from being mixed into single-walled carbon nanotubes.

Regarding the non-ionic surfactant, a non-ionic surfactant having a non-ionizable hydrophilic moiety and a hydrophobic moiety such as an alkyl chain is used. Examples of such a non-ionic surfactant include a non-ionic surfactant having a polyethylene glycol structure represented by a polyoxyethylene alkyl ether type.

Regarding such a non-ionic surfactant, a polyoxyethylene alkyl ether represented by the following Formula (1) is suitably used.

$$C_nH_{2n}(OCH_2CH_2)_mOH \quad (1)$$

(here, n=12 to 18, m=20 to 100)

Examples of a polyoxyethylene alkyl ether represented by Formula (1) include polyoxyethylene (23) lauryl ether (product name: Brij L23, commercially available from Sigma-Aldrich), polyoxyethylene (20) cetyl ether (product name: Brij C20, commercially available from Sigma-Aldrich), polyoxyethylene (20) stearyl ether (product name: Brij S20, commercially available from Sigma-Aldrich), polyoxyethylene (20) oleyl ether (product name: Brij O20, commercially available from Sigma-Aldrich), and polyoxyethylene (100) stearyl ether (product name: Brij S100, commercially available from Sigma-Aldrich).

Regarding the non-ionic surfactant, polyoxyethylene sorbitan monostearate (molecular formula: $C_{64}H_{126}O_{26}$, product name: Tween 60, commercially available from Sigma-Aldrich), polyoxyethylene sorbitan trioleate (molecular formula: $C_{24}H_{44}O_6$, product name: Tween 85, commercially available from Sigma-Aldrich), octylphenol ethoxylate (molecular formula: $C_{14}H_{22}O(C_2H_4O)_n$, n=1 to 10, product name: Triton X-100, commercially available from Sigma-Aldrich), polyoxyethylene (40) isooctyl phenyl ether (molecular formula: $C_8H_{17}C_6H_{40}(CH_2CH_{2O})_{40}H$, product name: Triton X-405, commercially available from Sigma-Aldrich), poloxamer (molecular formula: $C_5H_{10}O_2$, product name: Pluronic, commercially available from Sigma-Aldrich), and polyvinyl pyrrolidone (molecular formula: $(C_6H_9NO)_n$, n=5 to 100, commercially available from Sigma-Aldrich) or the like can be used.

The amount of the non-ionic surfactant in the single-walled carbon nanotube dispersion liquid is preferably 0.1 wt % or more and 5 wt % or less and more preferably 0.5 wt % or more and 2 wt % or less.

When the amount of the non-ionic surfactant is 5 wt % or less, the viscosity of the single-walled carbon nanotube dispersion liquid does not become too high, metallic single-walled carbon nanotubes and semiconducting single-walled carbon nanotubes contained in the single-walled carbon nanotube dispersion liquid can be easily separated through electrophoresis.

The amount of single-walled carbon nanotubes in the single-walled carbon nanotube dispersion liquid is preferably 1 μg/mL or more and 100 μg/mL or less and more preferably 5 μg/mL or more and 40 μg/mL or less.

When the amount of single-walled carbon nanotubes is within the above range, metallic single-walled carbon nanotubes and semiconducting single-walled carbon nanotubes contained in the single-walled carbon nanotube dispersion liquid can be easily separated through electrophoresis.

A method of preparing a single-walled carbon nanotube dispersion liquid is not particularly limited, and a known method is used. For example, a method in which a mixed solution of a dispersion medium containing a mixture of single-walled carbon nanotubes and a surfactant is subjected to an ultrasonic treatment and the mixture of single-walled carbon nanotubes is dispersed in the dispersion medium is an exemplary example. According to this ultrasonic treatment, the aggregated metallic single-walled carbon nanotubes and semiconducting single-walled carbon nanotubes are sufficiently separated, and in the single-walled carbon nanotube dispersion liquid, metallic single-walled carbon nanotubes and semiconducting single-walled carbon nanotubes are uniformly dispersed in the dispersion medium. Thereby, metallic single-walled carbon nanotubes and semiconducting single-walled carbon nanotubes are easily separated through electrophoresis to be described below. Here, metallic single-walled carbon nanotubes and semiconducting single-walled carbon nanotubes that are not dispersed according to an ultrasonic treatment are preferably removed by separation through ultracentrifugation.

Next, in the injection step, the single-walled carbon nanotube dispersion liquid is injected into the separation tank 11 (ST22).

Next, when a direct current voltage is applied to the first electrode 12 and the second electrode 13 for a predetermined time (for example, 1 hour to 100 hours) (ST23), an electric field is formed in the separation tank 11. Specifically, the electric field is formed so that the direction of the electric field is directed from the bottom of the separation tank 11 upward. Due to an electrophoretic force generated by the electric field and the charge of single-walled carbon nanotubes, metallic single-walled carbon nanotubes contained in the single-walled carbon nanotube dispersion liquid move toward the first electrode 12, and semiconducting single-walled carbon nanotubes move toward the second electrode 13. As described above, the mixture is separated into metallic single-walled carbon nanotubes and semiconducting single-walled carbon nanotubes through electrophoresis (ST24).

Figure 12:
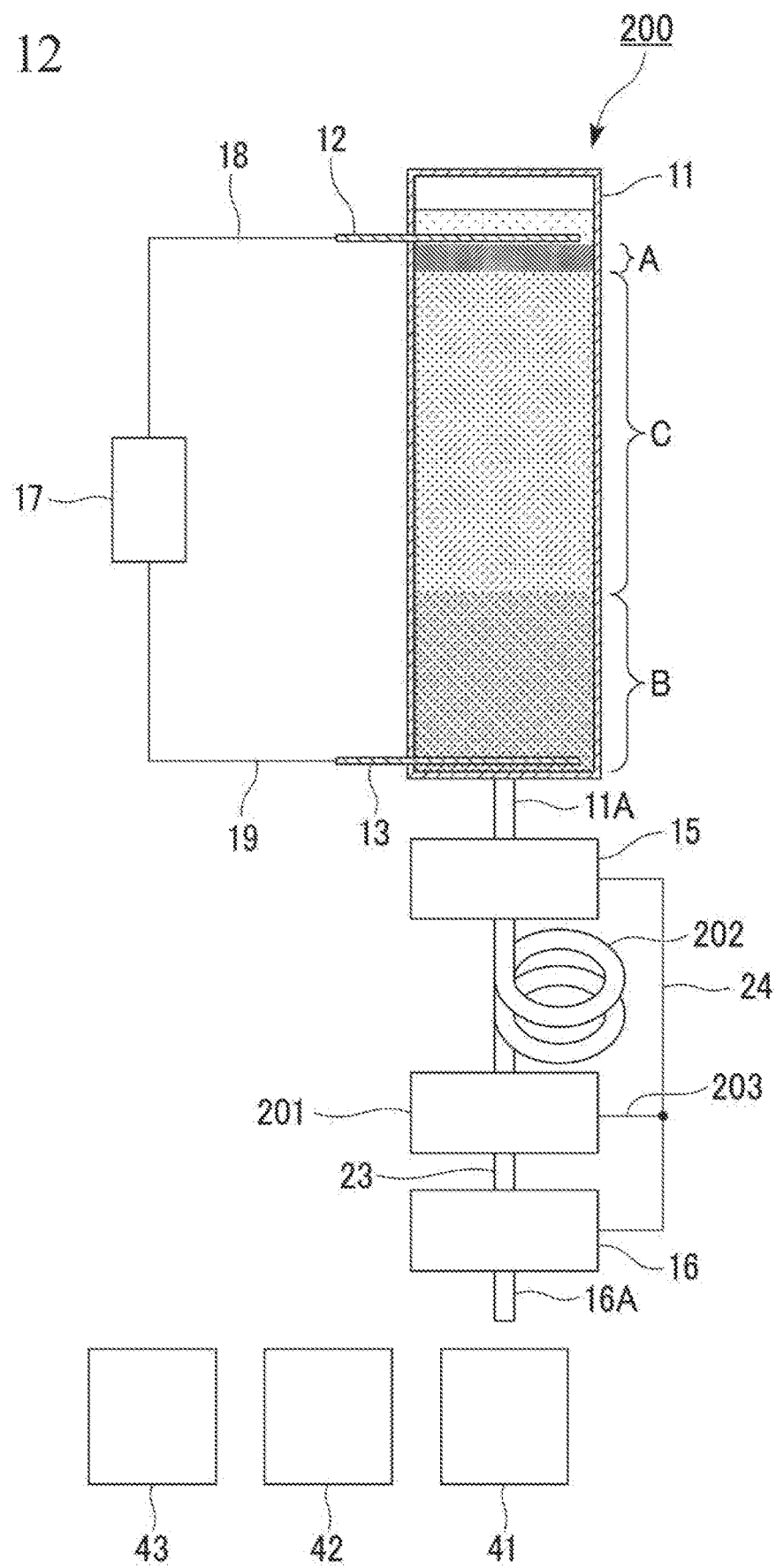
FIG. 12 is a schematic view showing the nanocarbon separation method of the fourth example embodiment.

Based on the result of electrophoresis, as shown in FIG. 12, the phase of the single-walled carbon nanotube dispersion liquid is separated into three phases including a dispersion liquid phase having a relatively large amount of metallic single-walled carbon nanotubes (hereinafter referred to as a "dispersion liquid phase A"), a dispersion liquid phase having a relatively large amount of semiconducting single-walled carbon nanotubes (hereinafter referred to as a "dispersion liquid phase B"), and a dispersion liquid phase which is formed between the dispersion liquid phase A and the dispersion liquid phase B and has a relatively small amount of metallic single-walled carbon nanotubes and semiconducting single-walled carbon nanotubes (hereinafter referred to as a "dispersion liquid phase C").

In the present example embodiment, the dispersion liquid phase A is formed on the side of the first electrode 12, and the dispersion liquid phase B is formed on the side of the second electrode 13.

A direct current voltage applied to the first electrode 12 and the second electrode 13 is not particularly limited, and is appropriately adjusted according to a distance between the first electrode 12 and the second electrode 13, the amount of the mixture of single-walled carbon nanotubes in the single-walled carbon nanotube dispersion liquid, or the like.

When water or heavy water is used as the dispersion medium of the single-walled carbon nanotube dispersion liquid, a direct current voltage applied to the first electrode 12 and the second electrode 13 has any value that is larger than 0 V and equal to or less than 1,000 V.

In addition, when a direct current voltage is applied to the first electrode 12 and the second electrode 13, the electric field between the first electrode 12 and the second electrode 13 is preferably 0.5 V/cm or more and 15 V/cm or less and more preferably 1 V/cm or more and 10 V/cm or less.

In the separation step, the temperature of the single-walled carbon nanotube dispersion liquid accommodated in the separation tank 11 is not particularly limited as long as it is a temperature at which the dispersion medium of the single-walled carbon nanotube dispersion liquid does not deteriorate or evaporate.

Next, the fractionation step (ST25) is performed. In the fractionation step, first, the single-walled carbon nanotube dispersion liquid is recovered from the separation tank 11 through the recovery port 11A (ST25a).

Regarding the single-walled carbon nanotube dispersion liquid recovered through the recovery port 11A, in the first evaluation step 15, a physical state and chemical state of the single-walled carbon nanotube dispersion liquid that passes through the recovery path 11A is measured and evaluated (ST25b).

In the nanocarbon separation method of the present example embodiment, the single-walled carbon nanotube dispersion liquid of which separation is completed in the separation tank 11 passes through the first evaluation means 15 through the recovery port 11A and moves to the flow path 202. Since the flow path 202 has a volume equal to or larger than the total amount in the separation tank 11, measurement by the second evaluation means 201 does not start until the first evaluation means 15 measures an optical absorption spectrum with respect to the total amount of the single-walled carbon nanotube dispersion liquid in the separation tank 11. When the first evaluation means 15 measures an optical absorption spectrum of the total amount of the single-walled carbon nanotube dispersion liquid, the distribution of the optical absorption spectrum of the entire single-walled carbon nanotube dispersion liquid is obtained, and even if an unknown sample is used, it is possible to evaluate a separation state of the single-walled carbon nanotube dispersion liquid.

Next, the second evaluation means 201 measures the optical absorption spectrum of the single-walled carbon nanotube dispersion liquid that passes therethrough (ST25d).

Next, in the fractionation step, the single-walled carbon nanotube dispersion liquid is fractionated based on the optical absorption spectrum of the entire single-walled carbon nanotube dispersion liquid obtained in the first evaluation means 15 and the optical absorption spectrum of the single-walled carbon nanotube dispersion liquid that has passed obtained in the second evaluation means 201 (ST25e). That is, in the fractionation step, distributions of metallic single-walled carbon nanotubes and semiconducting single-walled carbon nanotubes are measured and evaluated from the distribution of the total amount of the optical absorption spectrum in the flow path of the single-walled carbon nanotube dispersion liquid obtained in the first evaluation means 15, and based on the optical absorption spectrum of the single-walled carbon nanotube dispersion liquid that flows through the flow path obtained in the second evaluation means 201, single-walled carbon nanotube dispersion liquids having different amounts of metallic single-walled carbon nanotubes and semiconducting single-walled carbon nanotubes are separately recovered (fractionated) in the recovery tanks 41, 42, and 43.

In the fractionation step, for example, according to respective physical states or chemical states of the dispersion liquid phase A having a relatively large amount of metallic single-walled carbon nanotubes, the dispersion liquid phase B having a relatively large amount of semiconducting single-walled carbon nanotubes, and the dispersion liquid phase C having a relatively small amount of metallic single-walled carbon nanotubes and semiconducting single-walled carbon nanotubes, the single-walled carbon nanotube dispersion liquid is separately recovered (fractionated) in the recovery tanks 41, 42, and 43.

Here, fractionation (ST25) shown in FIG. 11 includes ST25a, ST25b, ST25c, ST25d and ST25e.

According to the nanocarbon separation method using the nanocarbon separation device 200 of the present example embodiment, without depending on a method of visually confirming that a dispersion liquid phase has been formed or a time for which a direct current voltage is applied between a pair of electrodes, based on the optical absorption spectrum of the entire single-walled carbon nanotube dispersion liquid in a physical state or chemical state obtained in the first evaluation step and the optical absorption spectrum of the single-walled carbon nanotube dispersion liquid in the flow path obtained in the second evaluation step, the separation state of metallic single-walled carbon nanotubes and semiconducting single-walled carbon nanotubes contained in the single-walled carbon nanotube dispersion liquid can be evaluated in more detail and fractionated. Therefore, also in a step of fractionating the single-walled carbon nanotube dispersion liquid having an unknown separation state, the separated single-walled carbon nanotubes can be fractionated with stable quality. In addition, since fractionation is performed according to the separation state, highly pure metallic single-walled carbon nanotubes and semiconducting single-walled carbon nanotubes can be fractionated and obtained.

Here, while a case in which a mixture of single-walled carbon nanotubes is separated into metallic single-walled carbon nanotubes and semiconducting single-walled carbon nanotubes has been provided as an exemplary example of the nanocarbon separation method using the nanocarbon separation device 200 of the present example embodiment, the nanocarbon separation method of the present example embodiment is not limited thereto. In the nanocarbon separation method of the present example embodiment, for example, a single-walled carbon nanotube purifying method in which the mixture is separated into metallic single-walled carbon nanotubes and semiconducting single-walled carbon nanotubes in the separation tank 11, and only single-walled carbon nanotubes having desired properties are then recovered may be performed.

WORKING EXAMPLES

While the present invention will be described below in more detail with reference to working examples, the present invention is not limited to the following working examples.

Working Example 1

FIG. 1 shows the separation device. The separation device is the same as in the first example embodiment. That is, the nanocarbon separation device 100 of this working example includes a separation tank (electrophoresis tank) 11 in which the nanocarbon dispersion liquid 30 is accommodated, the first electrode 12 provided at an upper part in the separation tank 11, the second electrode 13 provided at a lower part in the separation tank 11, the recovery port 11A through which a solution is recovered from the separation tank 11, the evaluation means 15 that evaluates physical and chemical properties of the nanocarbon dispersion liquid 30, which is attached to connect the recovery port 11A to the flow path 23, and the fractionation means 16 which is attached to the termination of the flow path 23 and fractionates the nanocarbon dispersion liquid 30 based on the physical state or chemical state of the nanocarbon dispersion liquid 30 evaluated by the evaluation means 15. In addition, the nanocarbon separation device 100 of the present example embodiment includes the direct current power supply 17 that applies a direct current voltage between the first electrode 12 and the second electrode 13. The direct current power supply 17 is electrically connected to the first electrode 12 via the cable 18 and is electrically connected to the second electrode 13 via the cable 19.

"Preparation of Single-Walled Carbon Nanotube Dispersion Liquid"

A solution AA in which 1.0 wt % of polyoxyethylene (100) stearyl ether (product name: Brij S100, commercially available from Sigma-Aldrich) as a non-ionic surfactant was dissolved in heavy water was prepared.

A mixture of single-walled carbon nanotubes (enhanced direct injection pyrolytic synthesis (eDIPS) single-walled carbon nanotubes, average diameter: 1.0 nm) was monodispersed in the solution AA.

The heavy water in which the mixture of single-walled carbon nanotubes was monodispersed was subjected to an ultrasonic dispersion treatment using a horn type ultrasonic crusher (product name: Digital Sonifier 450, commercially available from Branson) at an output of 40 W for 20 minutes. Then, an ultracentrifugation operation was performed using an ultracentrifuge (product name: CS100GX, commercially available from Hitachi Koki Co., Ltd.) at 250,000×g, 10° C. for 1 hour. Then, 50% of the supernatant was obtained as a dispersion liquid of a mixture of single-walled carbon nanotubes.

Next, the solution AA was added to the dispersion liquid of a mixture of single-walled carbon nanotubes, and a single-walled carbon nanotube dispersion liquid containing an amount of 10 μg/mL of single-walled carbon nanotubes and an amount of 1.0 wt % of polyoxyethylene (100) stearyl ether was obtained.

"Injection of Single-Walled Carbon Nanotube Dispersion Liquid"

The single-walled carbon nanotube dispersion liquid prepared as described above was injected into the separation tank 11 of the nanocarbon separation device 100.

"Separation Operation"

A direct current voltage was applied to the first electrode 12 (negative electrode) and the second electrode 13 (positive electrode) of the nanocarbon separation device 100.

"Separation Completion and Recovery"

When 100 hours had elapsed from when the direct current voltage was applied, the voltage application was terminated, and recovery of the single-walled carbon nanotube dispersion liquid from the nanocarbon recovery port 11A was started at a rate of 1 mL/min.

"Evaluation"

Figure 13:
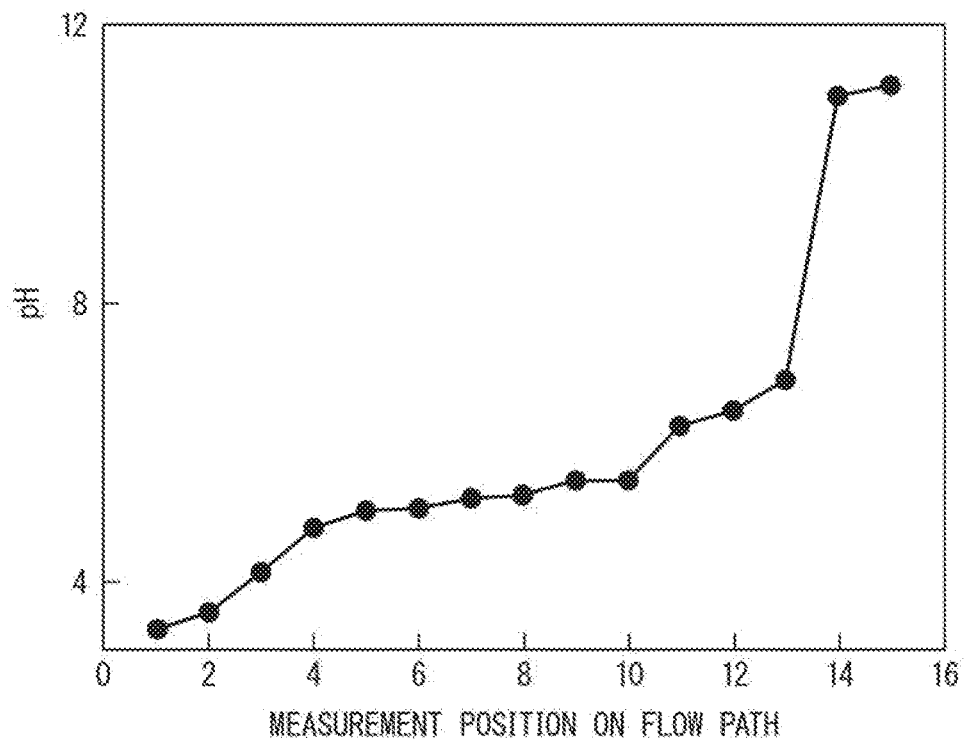
FIG. 13 is a diagram showing measurement results of pH of the single-walled carbon nanotube dispersion liquid in working example 1.

The evaluation means 15 measured the pH of the single-walled carbon nanotube dispersion liquid that passed therethrough. FIG. 13 shows change in the pH with respect to the position at which the liquid passed. Here, the single-walled carbon nanotube dispersion liquid was fractionated into a region with a pH of less than 4.5, a region with a pH of 4.5 or more and less than 6, a region with a pH of 6 or more and 8 or less, and a region with a pH of 8 or more, and recovery was performed. As a result, in the region with a pH of less than 4.5, the single-walled carbon nanotube dispersion liquid containing highly pure semiconducting single-walled carbon nanotubes was able to be recovered, and in the region with a pH of 6 or more and 8 or less, the single-walled carbon nanotube dispersion liquid containing highly pure metallic single-walled carbon nanotubes was able to be recovered.

Working Example 2

FIG. 1 shows the separation device. The separation device is the same as in the first example embodiment.

That is, the nanocarbon separation device 100 of this working example includes a separation tank (electrophoresis tank) 11 in which the nanocarbon dispersion liquid 30 is accommodated, the first electrode 12 provided at an upper part in the separation tank 11, the second electrode 13 provided at a lower part in the separation tank 11, the recovery port 11A through which a solution is recovered from the separation tank 11, the evaluation means 15 that evaluates physical and chemical properties of the nanocarbon dispersion liquid 30, which is attached to connect the recovery port 11A to the flow path 23, and the fractionation means 16 which is attached to the termination of the flow path 23 and fractionates the nanocarbon dispersion liquid 30 based on the physical state or chemical state of the nanocarbon dispersion liquid 30 evaluated by the evaluation means 15. In addition, the nanocarbon separation device 100 of the present example embodiment includes the direct current power supply 17 that applies a direct current voltage between the first electrode 12 and the second electrode 13. The direct current power supply 17 is electrically connected to the first electrode 12 via the cable 18 and is electrically connected to the second electrode 13 via the cable 19.

"Preparation of Single-Walled Carbon Nanotube Dispersion Liquid"

A solution AA in which 1.0 wt % of polyoxyethylene (100) stearyl ether (product name: Brij S100, commercially available from Sigma-Aldrich) as a non-ionic surfactant was dissolved in heavy water was prepared.

A mixture of single-walled carbon nanotubes (enhanced direct injection pyrolytic synthesis (eDIPS) single-walled carbon nanotubes, average diameter: 1.0 nm) was monodispersed in the solution AA.

The heavy water in which the mixture of single-walled carbon nanotubes was monodispersed was subjected to an ultrasonic dispersion treatment using a horn type ultrasonic crusher (product name: Digital Sonifier 450, commercially available from Branson) at an output of 40 W for 20 minutes. Then, an ultracentrifugation operation was performed using an ultracentrifuge (product name: CS100GX, commercially available from Hitachi Koki Co., Ltd.) at 250,000×g, 10° C. for 1 hour. Then, 50% of the supernatant was obtained as a dispersion liquid of a mixture of single-walled carbon nanotubes.

Next, the solution AA was added to the dispersion liquid of a mixture of single-walled carbon nanotubes, and a single-walled carbon nanotube dispersion liquid containing an amount of 10 μg/mL of single-walled carbon nanotubes and an amount of 1.0 wt % of polyoxyethylene (100) stearyl ether was obtained.

"Injection of Single-Walled Carbon Nanotube Dispersion Liquid"

The single-walled carbon nanotube dispersion liquid prepared as described above was injected into the separation tank 11 of the nanocarbon separation device 100.

"Separation Operation"

A direct current voltage was applied to the first electrode 12 (negative electrode) the second electrode 13 (positive electrode) of the nanocarbon separation device 100.

"Separation Completion and Recovery"

When 100 hours had elapsed from when the direct current voltage was applied, the voltage application was terminated, and recovery of the single-walled carbon nanotube dispersion liquid from the nanocarbon recovery port 11A was started at a rate of 1 mL/min.

"Evaluation"

Figure 14:
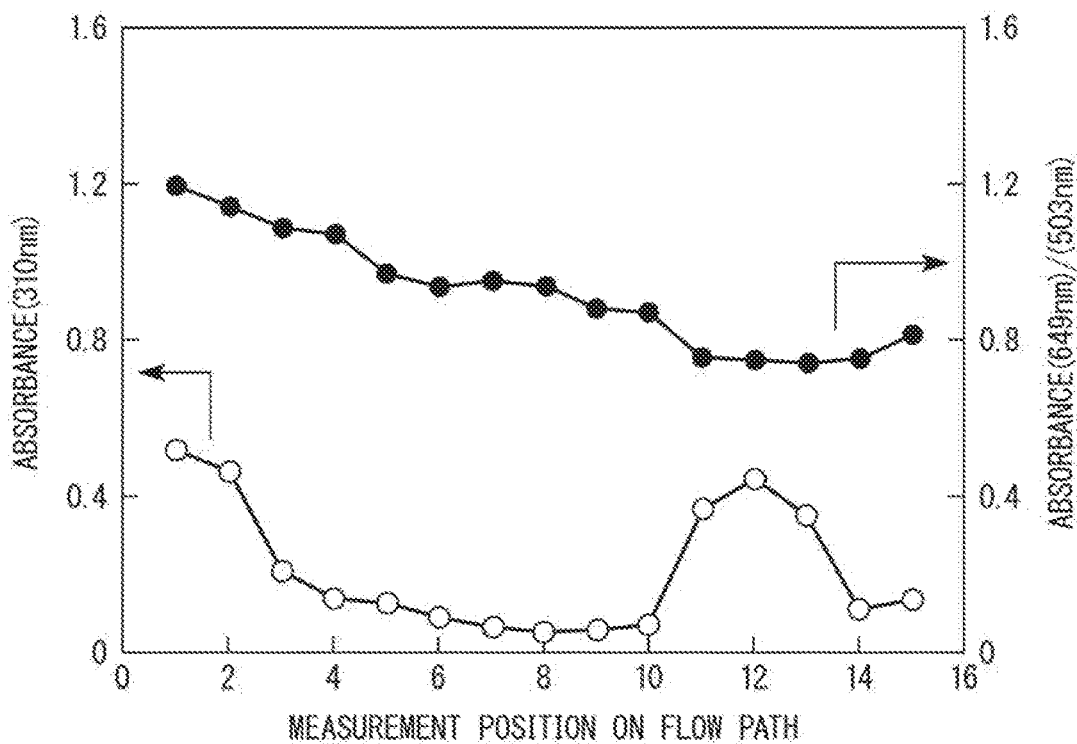
FIG. 14 is a diagram showing evaluation results of absorbance of the single-walled carbon nanotube dispersion liquid in working example 2.

The evaluation means 15 measured the absorbance at three different wavelengths of 310 nm, 503 nm, and 649 nm using the single-walled carbon nanotube dispersion liquid that passed therethrough. The white circles plot in FIG. 14 indicate the absorbance at a wavelength of 310 nm plotted for each flow rate. The absorbance at 310 nm can be used to evaluate the concentration of the single-walled carbon nanotube dispersion liquid. In addition, the absorbance of the single-walled carbon nanotube dispersion liquid at 649 nm can typically represent the amount of semiconducting single-walled carbon nanotubes in eDIPS nanotubes with an average diameter of 1.0 nm, and similarly, the absorbance of the single-walled carbon nanotube dispersion liquid at a wavelength of 503 nm can typically represent the amount of metallic single-walled carbon nanotubes. Here, it is possible to obtain a separation state of semiconducting single-walled carbon nanotubes and metallic single-walled carbon nanotubes by dividing the absorbance at 649 nm by the absorbance at 503 nm. In FIG. 14, the black circles indicate values obtained by dividing the absorbance at 649 nm by the absorbance at 503 nm. Here, the liquid was fractionated into a region (semiconducting type) in which the absorbance at 310 nm was 0.3 or more, and the value obtained by dividing the absorbance at 649 nm by the absorbance at 503 nm was 1.1 or more, a region (metallic type) in which the absorbance at 310 nm was 0.3 or more and the value obtained by dividing the absorbance at 649 nm by the absorbance at 503 nm was 0.9 or less, and the other region, and recovery was performed. As a result, it was possible to separately recover the highly pure semiconducting single-walled carbon nanotube dispersion liquid and the highly pure metallic single-walled carbon nanotube dispersion liquid.

Working Example 3

FIG. 1 shows the separation device. The separation device is the same as that shown in working example 2. That is, the nanocarbon separation device 10 of this working example includes a separation tank (electrophoresis tank) 11 in which the nanocarbon dispersion liquid 30 is accommodated, the first electrode 12 provided at an upper part in the separation tank 11, the second electrode 13 provided at a lower part in the separation tank 11, an evaluation means 14 that evaluates a physical state or chemical state of the nanocarbon dispersion liquid 30 in the separation tank 11, the recovery port 11A through which a solution is recovered from the separation tank 11, the flowmeter 25 that measures a flow rate of the nanocarbon dispersion liquid 30, which is attached to connect the recovery port 11A to the flow path 23, and the fractionation means 16 which is attached to the termination of the flow path 23 and fractionates the nanocarbon dispersion liquid 30 based on the physical state or chemical state of the nanocarbon dispersion liquid 30 evaluated by the evaluation means 14 and the flow rate of the nanocarbon dispersion liquid 30 evaluated by the flowmeter 25. In addition, the nanocarbon separation device 10 of the present example embodiment includes the direct current power supply 17 that applies a direct current voltage between the first electrode 12 and the second electrode 13. The direct current power supply 17 is electrically connected to the first electrode 12 via the cable 18 and is electrically connected to the second electrode 13 via the cable 19.

The evaluation means 14 included an evaluation device (evaluation electrode) 20 that measured a potential in the solution and an evaluation device (potentiometer) 21. In the separation tank 11, nine evaluation devices 20 were arranged at intervals of 1 cm in the height direction. In addition, the distance between the first electrode 12 and second electrode 13 was set to 10 cm.

"Preparation of Single-Walled Carbon Nanotube Dispersion Liquid"

A solution AA in which 1.0 wt % of polyoxyethylene (100) stearyl ether (product name: Brij S100, commercially available from Sigma-Aldrich) as a non-ionic surfactant was dissolved in heavy water was prepared.

A mixture of single-walled carbon nanotubes (enhanced direct injection pyrolytic synthesis (eDIPS) single-walled carbon nanotubes, average diameter: 1.0 nm) was monodispersed in the solution AA.

The heavy water in which the mixture of single-walled carbon nanotubes was monodispersed was subjected to an ultrasonic dispersion treatment using a horn type ultrasonic crusher (product name: Digital Sonifier 450, commercially available from Branson) at an output of 40 W for 20 minutes. Then, an ultracentrifugation operation was performed using an ultracentrifuge (product name: CS100GX, commercially available from Hitachi Koki Co., Ltd.) at 250,000×g, 10° C. for 1 hour. Then, 50% of the supernatant was obtained as a dispersion liquid of a mixture of single-walled carbon nanotubes.

Next, the solution AA was added to the dispersion liquid of a mixture of single-walled carbon nanotubes, and a single-walled carbon nanotube dispersion liquid containing an amount of 10 µg/mL of single-walled carbon nanotubes and an amount of 1.0 wt % of polyoxyethylene (100) stearyl ether was obtained.

"Injection of Single-Walled Carbon Nanotube Dispersion Liquid"

Figure 4:
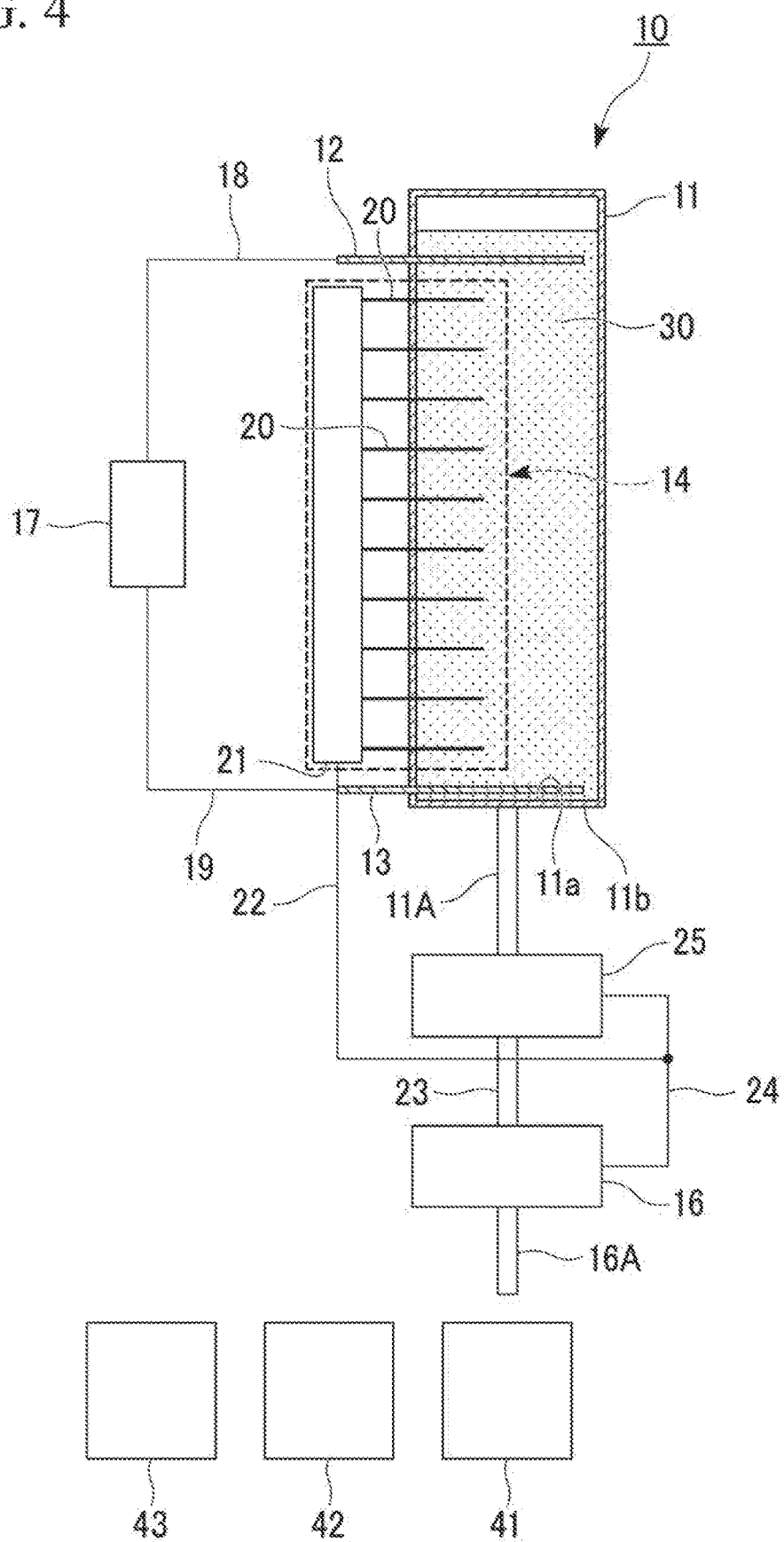
FIG. 4 is a schematic view showing a nanocarbon separation device of a second example embodiment.

The single-walled carbon nanotube dispersion liquid prepared as described above was injected into the separation tank 11 of the nanocarbon separation device 10 shown in FIG. 4.

"Separation Operation"

A direct current voltage was applied to the first electrode 12 (negative electrode) and the second electrode 13 (positive electrode) of the nanocarbon separation device 10.

"Separation Completion and Evaluation"

Figure 15:
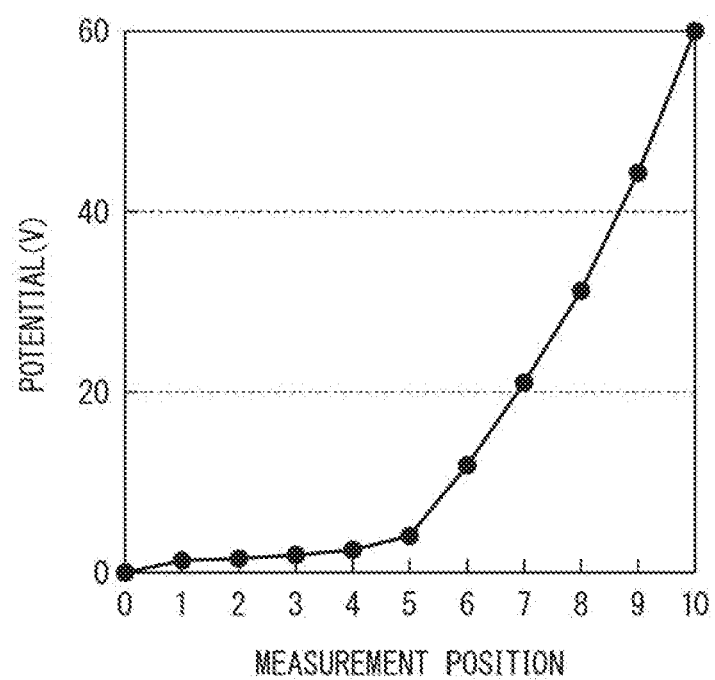
FIG. 15 is a diagram showing measurement results of a potential in a separation tank containing a single-walled carbon nanotube dispersion liquid in working example 3.

After 100 hours had elapsed from when the direct current voltage was applied and before the voltage application was terminated, the evaluation means 14 measured a potential in the separation tank 11. FIG. 15 shows the potential at each position at that time.

"Recovery"

Here, the recovery of the single-walled carbon nanotube dispersion liquid from the nanocarbon recovery port 11A started at a rate of 1 mL/min. The flowmeter 25 measured the amount of the single-walled carbon nanotube dispersion liquid that passed through the flow path. Since the capacity with respect to the position in the separation tank 11 was known, a separation state of single-walled carbon nanotubes at the measurement position was evaluated according to the flow rate and the slope of the potential (potential gradient) in FIG. 15. That is, the liquid was fractionated into a single-walled carbon nanotube dispersion liquid (semiconducting type) before the measurement position 4, a single-walled carbon nanotube dispersion liquid (others) from the measurement positions 4 to 6, and a single-walled carbon nanotube dispersion liquid (metallic type) at the measurement position 7 or thereafter, and recovery was performed.

Working Example 4

"Preparation of Single-Walled Carbon Nanotube Dispersion Liquid"

In the same manner as in working example 1, a single-walled carbon nanotube dispersion liquid was prepared.

"Injection of Single-Walled Carbon Nanotube Dispersion Liquid"

Figure 16:
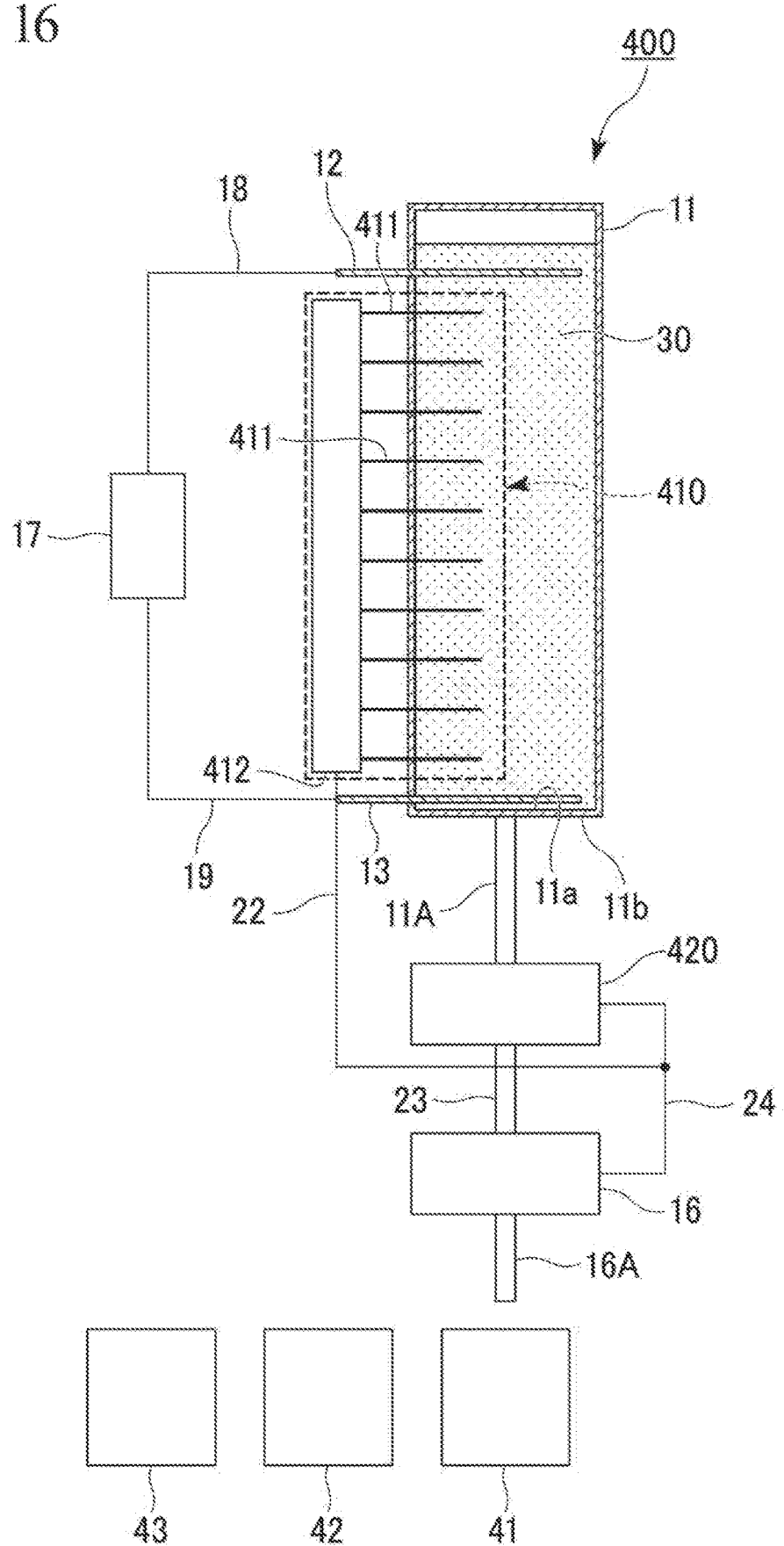
FIG. 16 is a schematic view showing a nanocarbon separation device in working example 4.

The single-walled carbon nanotube dispersion liquid prepared as described above was injected into the separation tank 11 of a nanocarbon separation device 400 shown in FIG. 16.

Fifteen pH sensors 411 were arranged at intervals of 1 cm in the height direction in the separation tank 11. The distance between the uppermost pH sensor 411 and the lowermost pH sensor 411 was set to 14 cm.

"Separation Operation"

A direct current voltage was applied to the first electrode 12 (negative electrode) and the second electrode 13 (positive electrode) of the nanocarbon separation device 400.

"Evaluation"

The pH of the single-walled carbon nanotube dispersion liquid was evaluated using the nanocarbon separation device 400 shown in FIG. 16 as follows.

Figure 17:
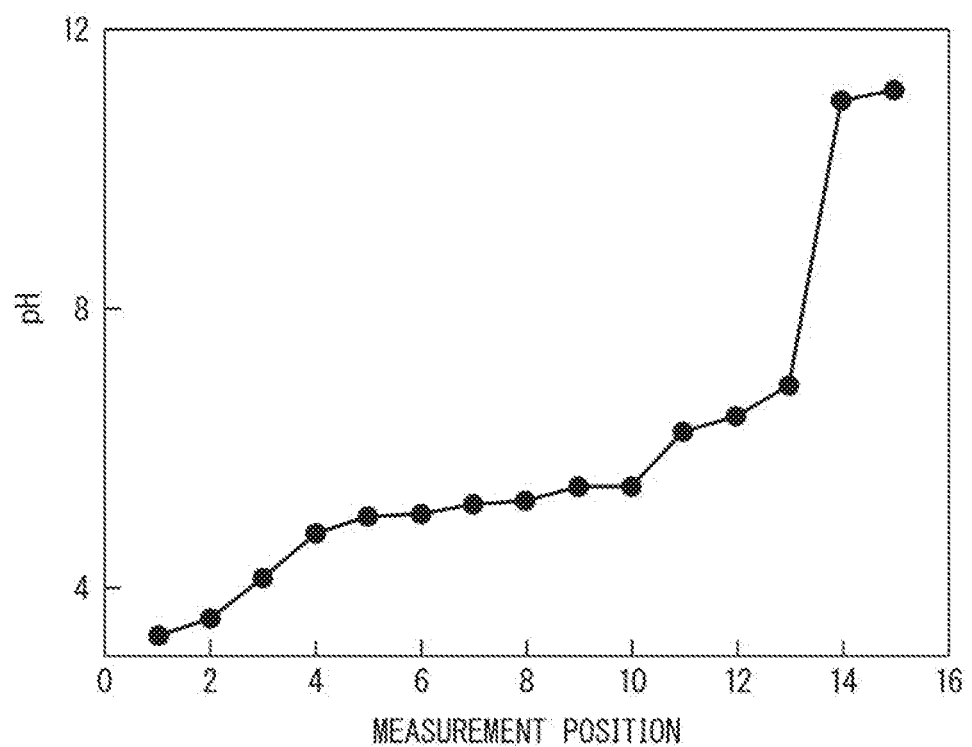
FIG. 17 is a diagram showing measurement results of pH of a single-walled carbon nanotube dispersion liquid in working example 4.

Immediately after the voltage was applied and 100 hours after voltage application started, a pH meter 412 measured the pH at each pH sensor 411, and a pH gradient of the single-walled carbon nanotube dispersion was evaluated. FIG. 17 shows the pH gradient of the single-walled carbon nanotube dispersion liquid 100 hours after voltage application starts. In FIG. 17, the measurement position shown on the horizontal axis is a position of the separation tank 11 in the height direction. The measurement position 1 is on the lowermost side of the separation tank 11, and the measurement position 15 is on the uppermost side of the separation tank 11.

In FIG. 17, since points at which the amount of change in the pH gradient changed greatly were the measurement position 4, the measurement position 10, and the measurement position 13, it was confirmed that the single-walled carbon nanotube dispersion liquid containing single-walled carbon nanotubes having the same properties was present in a range from the measurement position 1 to the measurement position 4, a range from the measurement position 4 to the measurement position 10, and a range from the measurement position 10 to the measurement position 13. The single-walled carbon nanotube dispersion liquid in each region could be recovered separately from the single-walled carbon nanotube dispersion liquid in other regions (other measurement positions).

Working Example 5

"Preparation of Single-Walled Carbon Nanotube Dispersion Liquid"

In the same manner as in working example 1, a single-walled carbon nanotube dispersion liquid was prepared.

"Injection of Single-Walled Carbon Nanotube Dispersion Liquid"

Figure 18:
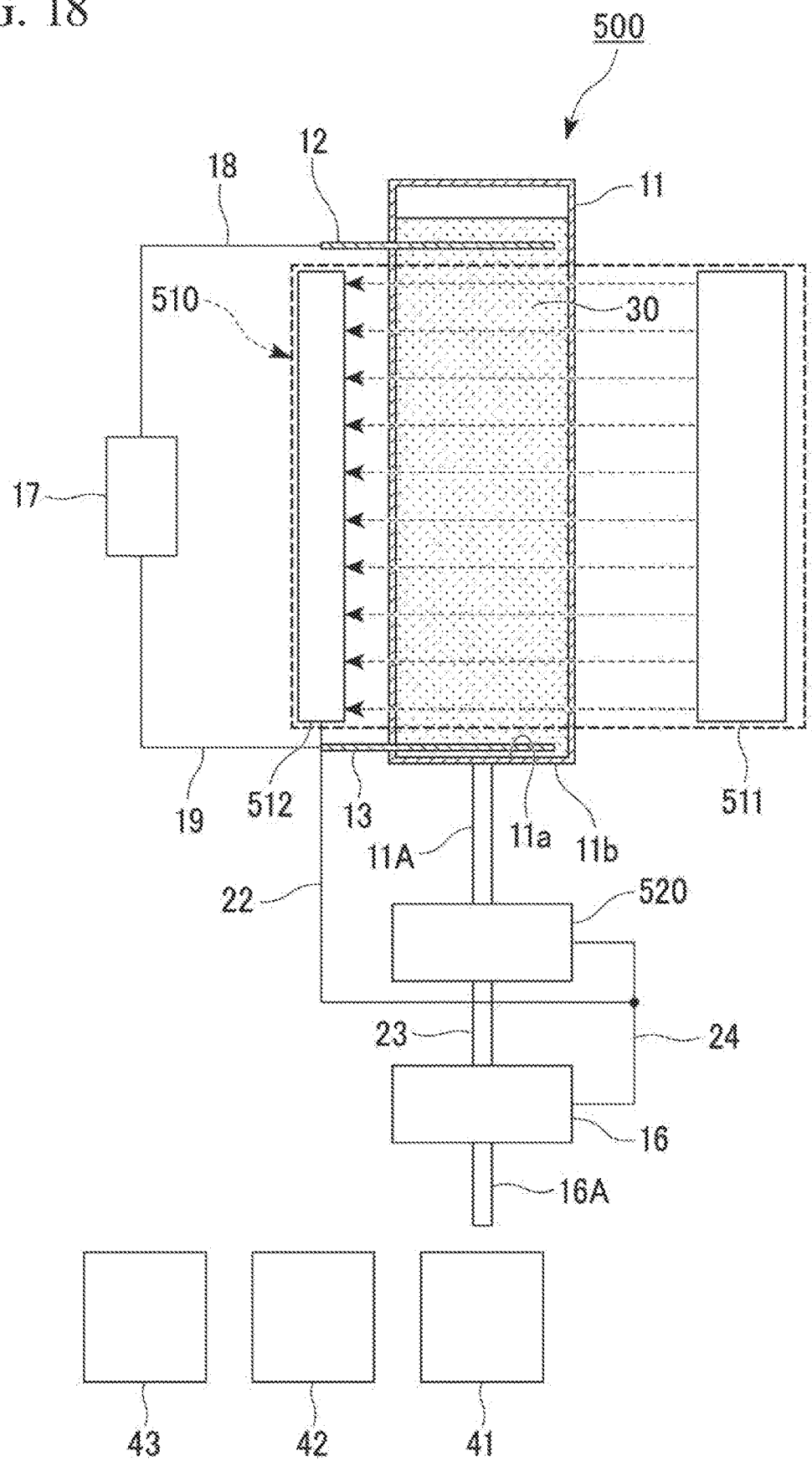
FIG. 18 is a schematic view showing a nanocarbon separation device in Example 5.

The single-walled carbon nanotube dispersion liquid prepared as described above was injected into the separation tank 11 of a nanocarbon separation device 500 shown in FIG. 18.

In a detector 512, fifteen detecting units were arranged at intervals of 1 cm in the height direction of the separation tank 11. The distance between the uppermost detecting unit and the lowermost detecting unit was set to 14 cm.

"Separation Operation"

A direct current voltage was applied to the first electrode 12 (negative electrode) and the second electrode 13 (positive electrode) of the nanocarbon separation device 500.

"Evaluation"

The absorption spectrum of the single-walled carbon nanotube dispersion liquid was evaluated using the nanocarbon separation device 500 shown in FIG. 18 as follows.

Immediately after the voltage was applied and 100 hours after voltage application started, the detector 512 measured the absorbance at each detecting unit, and the absorbance of the single-walled carbon nanotube dispersion liquid was evaluated. A spectrophotometer (product name: UV-VIS-NIR Spectrophotometer UV-3600, commercially available from Shimadzu Corporation) was used to measure the absorbance of the single-walled carbon nanotube dispersion liquid.

Figure 19:
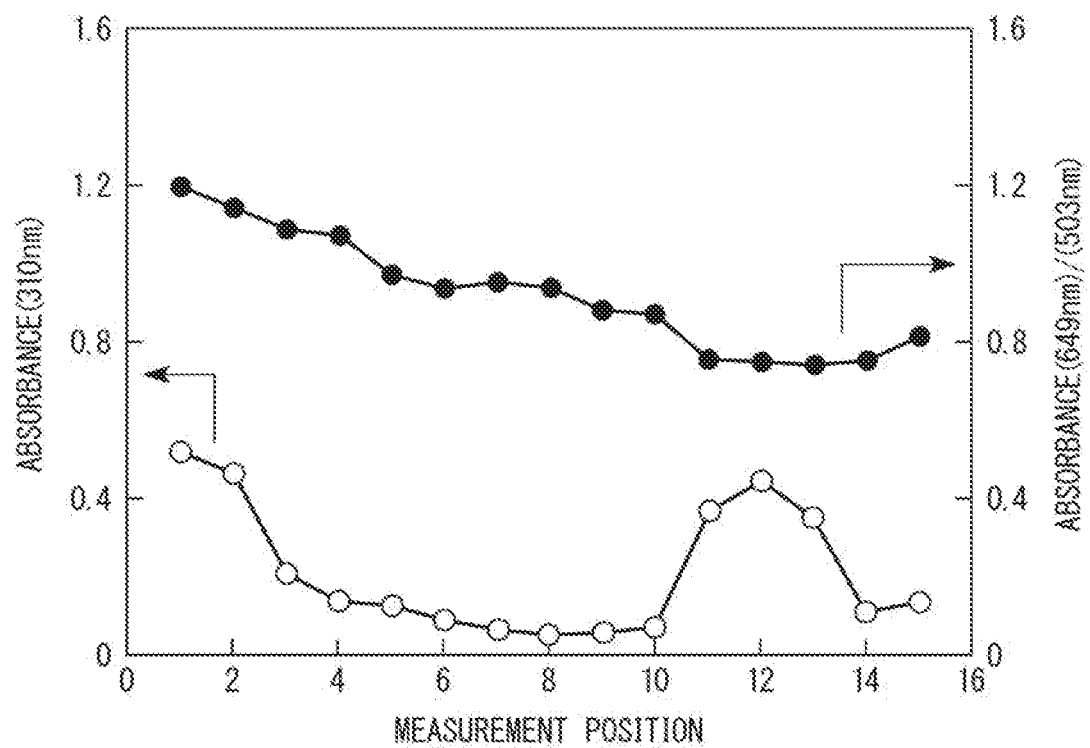
FIG. 19 is a diagram showing evaluation results of absorbance of a single-walled carbon nanotube dispersion liquid in working example 5.

FIG. 19 shows the absorbance of the single-walled carbon nanotube dispersion liquid 100 hours after voltage application starts. In FIG. 19, the measurement position shown on the horizontal axis is a position of the separation tank 11 in the height direction. The measurement position 1 is on the lowermost side of the separation tank 11, and the measurement position 15 is on the uppermost side of the separation tank 11.

In FIG. 19, since points at which the amount of change in the absorbance changed greatly were the measurement position 3, the measurement position 10, and the measurement position 14, it was confirmed that the single-walled carbon nanotube dispersion liquid containing single-walled carbon nanotubes having the same properties was present in a range from the measurement position 1 to the measurement position 3, a range from the measurement position 3 to the measurement position 10, and a range from the measurement position 10 to the measurement position 14.

Here, the recovery of the single-walled carbon nanotube dispersion liquid from the recovery port 11A started. A flowmeter provided in a second evaluation means 520 was used, and when a range from the measurement position 1 to the measurement position 3, a range from the measurement position 3 to the measurement position 10, and a range from the measurement position 10 to the measurement position 14 reached the fractionation means 16, separation was performed and recovery was performed. As a result, the single-walled carbon nanotube dispersion liquid in each region could be recovered separately from the single-walled carbon nanotube dispersion liquid in other regions (other measurement positions).

Working Example 6

FIG. 1 shows the separation device. The separation device is the same as in the first example embodiment.

That is, the nanocarbon separation device 10 of this working example includes a separation tank (electrophoresis tank) 11 in which the nanocarbon dispersion liquid 30 is accommodated, the first electrode 12 provided at an upper part in the separation tank 11, the second electrode 13 provided at a lower part in the separation tank 11, an evaluation means 14 that evaluates a physical state or chemical state of the nanocarbon dispersion liquid 30 in the separation tank 11, the recovery port 11A through which a solution is recovered from the separation tank 11, the flowmeter 25 that measures a flow rate of the nanocarbon dispersion liquid 30, which is attached to connect the recovery port 11A to the flow path 23, and the fractionation means 16 which is attached to the termination of the flow path 23 and fractionates the nanocarbon dispersion liquid 30 based on the physical state or chemical state of the nanocarbon dispersion liquid 30 evaluated by the evaluation means 14 and the flow rate of the nanocarbon dispersion liquid 30 evaluated by the flowmeter 25. In addition, the nanocarbon separation device 10 of the present example embodiment includes the direct current power supply 17 that applies a direct current voltage between the first electrode 12 and the second electrode 13. The direct current power supply 17 is electrically connected to the first electrode 12 via the cable 18 and is electrically connected to the second electrode 13 via the cable 19.

The evaluation means 14 included an evaluation device (evaluation electrode) 20 that measures a potential in the solution and an evaluation device (potentiometer) 21. In the separation tank 11, nine evaluation electrodes 20 were arranged at intervals of 1 cm in the height direction. In addition, the distance between the first electrode 12 and second electrode 13 was set to 10 cm.

"Preparation of Single-Walled Carbon Nanotube Dispersion Liquid"

A solution AA in which 1.0 wt % of polyoxyethylene (100) stearyl ether (product name: Brij S100, commercially available from Sigma-Aldrich) as a non-ionic surfactant was dissolved in heavy water was prepared.

A mixture of single-walled carbon nanotubes (enhanced direct injection pyrolytic synthesis (eDIPS) single-walled carbon nanotubes, average diameter: 1.0 nm) was monodispersed in the solution AA.

The heavy water in which the mixture of single-walled carbon nanotubes was monodispersed was subjected to an ultrasonic dispersion treatment using a horn type ultrasonic crusher (product name: Digital Sonifier 450, commercially available from Branson) at an output of 40 W for 20 minutes. Then, an ultracentrifugation operation was performed using an ultracentrifuge (product name: CS100GX, commercially available from Hitachi Koki Co., Ltd.) at 250,000×g, 10° C. for 1 hour. Then, 50% of the supernatant was obtained as a dispersion liquid of a mixture of single-walled carbon nanotubes.

Next, the solution AA was added to the dispersion liquid of a mixture of single-walled carbon nanotubes, and a single-walled carbon nanotube dispersion liquid containing an amount of 10 μg/mL of single-walled carbon nanotubes and an amount of 1.0 wt % of polyoxyethylene (100) stearyl ether was obtained.

"Injection of Single-Walled Carbon Nanotube Dispersion Liquid"

The single-walled carbon nanotube dispersion liquid prepared as described above was injected into the separation tank 11 of the nanocarbon separation device 100.

"Separation Operation"

A direct current voltage was applied to the first electrode 12 (negative electrode) and the second electrode 13 (positive electrode) of the nanocarbon separation device 100. In this case, a separation state of single-walled carbon nanotubes in the nanocarbon separation device is evaluated using the evaluation device 20, and it is possible to determine completion of the separation.

Immediately after the voltage was applied and 100 hours after voltage application started, absolute values of relative potentials of the respective evaluation electrodes 20 and the uppermost first electrode 12 (negative electrode) with respect to the lowermost second electrode 13 (positive electrode) were measured by the evaluation device 20.

Figure 20:
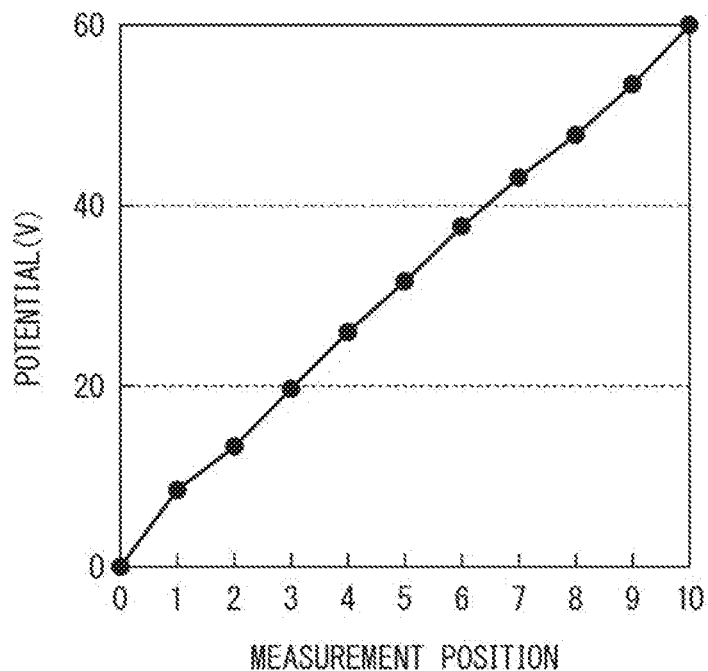
FIG. 20 is a diagram showing measurement results of a potential of a single-walled carbon nanotube dispersion liquid in a separation tank immediately after a voltage is applied in working example 6.

FIG. 20 shows the measured value of the potential of the single-walled carbon nanotube dispersion liquid immediately after the voltage is applied. The vertical axis represents an absolute value of a relative potential with respect to the second electrode 13 (positive electrode) and the horizontal axis represents the electrode position. The electrode 0 indicates the lowermost second electrode 13 (positive electrode), the electrode 10 indicates the uppermost first electrode 12 (negative electrode), and 1 to 9 indicate respective evaluation electrodes 20, and the electrodes are located higher in the separation tank 11 as the number increases. The potential of the electrode 10 is 60 V, which was equal to a direct current voltage applied for electrophoresis. Immediately after the voltage is applied, since the dispersion liquid is uniform, the potential in the separation tank 11 is uniform, and the relationship between the measurement position and the potential is almost linear as shown in FIG. 20.

Figure 21:
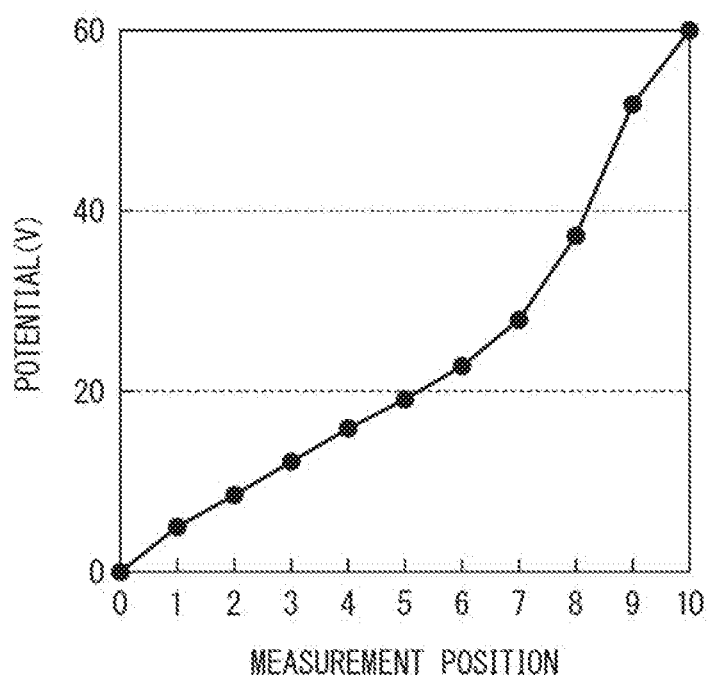
FIG. 21 is a diagram showing measurement results of a potential of a single-walled carbon nanotube dispersion liquid in a separation tank for 6 hours after voltage application starts in working example 6.

FIG. 21 shows the measurement results after 6 hours. After 6 hours, separation has progressed. Due to an electrophoretic force, the metallic single-walled carbon nanotubes contained in the single-walled carbon nanotube dispersion liquid moved toward the first electrode 12 and the semiconducting single-walled carbon nanotubes moved toward the second electrode 13. After 6 hours, an interface between the dispersion liquid phase B having a large amount of semiconducting single-walled carbon nanotubes and the dispersion liquid phase C having a relatively small amount of single-walled carbon nanotubes was near the electrode position 7. In FIG. 21, it can be understood that the potential gradient changes at the electrode position 7. The potential gradient is large in the part of the separation tank 11 above the electrode position 7, and the potential gradient is small in the part of the separation tank 11 below the electrode position 7. That is, it can be understood that the potential gradient is smaller in the dispersion liquid phase B having a large amount of semiconducting single-walled carbon nanotubes in the separation tank 11 than other parts.

Figure 22:
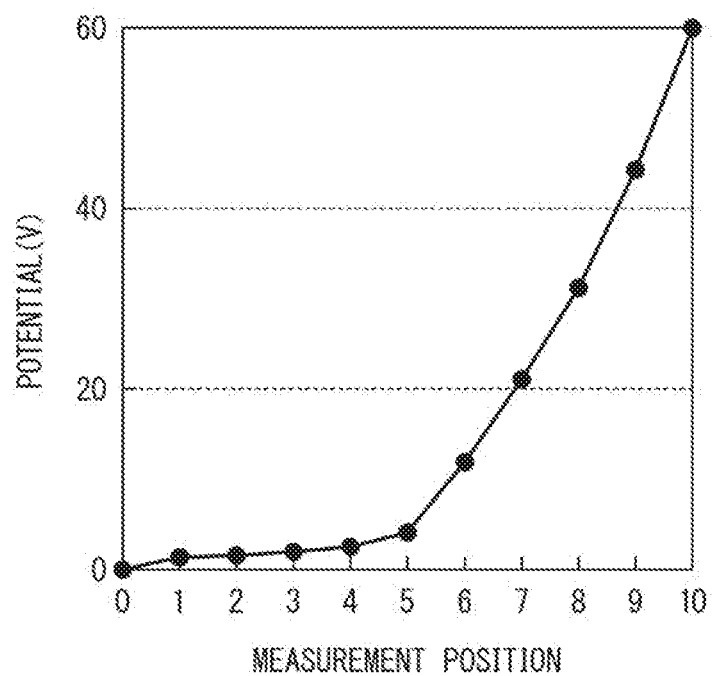
FIG. 22 is a diagram showing measurement results of a potential of a single-walled carbon nanotube dispersion liquid in a separation tank for 100 hours after the voltage is applied in working example 6.

FIG. 22 shows the measurement results after 100 hours. After 100 hours, the separation has further progressed. In FIG. 22, almost no potential gradient is observed below the electrode position 5. In this case, semiconducting single-walled carbon nanotubes are collected below the electrode position 5 in the separation tank 11. Accordingly, when a plurality of potential evaluation electrodes 20 were provided in the separation tank 11, and the dependence of the potential on the position was measured, it was possible to detect a separation state in the separation tank 11.

In this case, for example, if a time point at which the dispersion liquid phase B having a large amount of semiconducting single-walled carbon nanotubes is positioned below the electrode position 5 is set as an end point of separation, when a point at which the potential gradient changes greatly as shown in FIG. 22 is the electrode position 5, voltage application during electrophoresis can be stopped. This end point position can be changed according to a desired degree of separation.

In addition, a recovery region can be determined from the potential gradient at the time of completion. In the example in FIG. 22, the liquid can be evaluated by fractionating into a single-walled carbon nanotube dispersion liquid (semiconducting type) before the measurement position 4, a single-walled carbon nanotube dispersion liquid (others) from the measurement positions 4 to 6, and a single-walled carbon nanotube dispersion liquid (metallic type) at the measurement position 7 or thereafter.

"Recovery"

Here, the recovery of the single-walled carbon nanotube dispersion liquid from the nanocarbon recovery port 11A started at a rate of 1 mL/min. The flowmeter 25 measured the amount of the single-walled carbon nanotube dispersion liquid that passed through the flow path. Since the capacity with respect to the position in the separation tank 11 was known, fractionation was performed according to the flow rate and the separation of fractionation regions based on the measurement positions described above. That is, the liquid was fractionated into a single-walled carbon nanotube dispersion liquid (semiconducting type) before the measurement position 4, a single-walled carbon nanotube dispersion liquid (others) from the measurement positions 4 to 6, and a single-walled carbon nanotube dispersion liquid (metallic type) at the measurement position 7 or thereafter, and recovery was performed.

While some or all parts of the above example embodiments will be described in the following supplementary notes, the present invention is not limited thereto.

(Supplementary Note 1)

A nanocarbon separation device, including: a separation tank that is configured to accommodate a dispersion liquid including nanocarbons; a first electrode that is provided at an upper part in the separation tank; a second electrode that is provided at a lower part in the separation tank; an evaluation means that is configured to evaluate a physical state or a chemical state of the dispersion liquid; and a fractionation means that is configured to fractionate the dispersion liquid based on the physical state or the chemical state.

(Supplementary note 2) The nanocarbon separation device according to supplementary note 1, wherein the evaluation means is provided between the separation tank and the fractionation means.

(Supplementary note 3) The nanocarbon separation device according to supplementary note 1, wherein the evaluation means is provided in the separation tank.

(Supplementary note 4) The nanocarbon separation device according to supplementary note 2, wherein the evaluation means is further provided in the separation tank.

(Supplementary note 5) The nanocarbon separation device according to supplementary note 1, wherein two evaluation means are provided between the separation tank and the fractionation means via a flow path that connects the separation tank to the fractionation means.

(Supplementary note 6) The nanocarbon separation device according to any one of supplementary notes 1 to 5, wherein the evaluation means is at least one selected from a group including a means that is configured to measure a potential of the dispersion liquid, a means that is configured to measure a pH of the dispersion liquid, a means that is configured to measure an absorbance of the dispersion liquid, a means that is configured to measure an emission spectrum of the dispersion liquid, a means that is configured to measure a refractive index of the dispersion liquid, and a means that is configured to measure a conductivity of the dispersion liquid.

(Supplementary note 7) A nanocarbon separation method, including: a step of injecting a dispersion liquid including nanocarbons into a separation tank; a step of separating the metallic nanocarbons and the semiconducting nanocarbons by applying a direct current voltage between a first electrode provided at an upper part in the separation tank and a second electrode provided at a lower part in the separation tank, to cause metallic nanocarbons included in the dispersion liquid to move toward the first electrode, and to cause semiconducting nanocarbons included in the dispersion liquid to move toward the second electrode; a step of evaluating a physical state or a chemical state of the dispersion liquid; and a step of fractionating the dispersion liquid based on the physical state or the chemical state.

(Supplementary note 8) The nanocarbon separation method according to supplementary note 7, wherein the step of evaluating a physical state or a chemical state of the dispersion liquid is performed between the step of separating the metallic nanocarbons and the semiconducting nanocarbons and the step of fractionating the dispersion liquid.

(Supplementary note 9) The nanocarbon separation method according to supplementary note 7, wherein the step of evaluating a physical state or a chemical state of the dispersion liquid is performed during the step of separating the metallic nanocarbons and the semiconducting nanocarbons.

(Supplementary note 10) The nanocarbon separation method according to supplementary note 7, wherein the step of evaluating a physical state or a chemical state of the dispersion liquid is performed before or after a flow path that connects a fractionation means which is configured to fractionate the separation tank and the dispersion liquid.

(Supplementary note 11) The nanocarbon separation method according to any one of supplementary notes 7 to 10, wherein, in the step of evaluating a physical state or a chemical state of the dispersion liquid, the physical state or the chemical state of the dispersion liquid is evaluated according to at least one selected from a group consisting of a potential of the dispersion liquid, a pH of the dispersion liquid, an absorbance of the dispersion liquid, an emission spectrum of the dispersion liquid, a refractive index of the dispersion liquid, and a conductivity of the dispersion liquid.

REFERENCE SYMBOLS 10, 100, 200, 400, 500 Nanocarbon separation device
11 Separation tank
12 First electrode
13 Second electrode
14, 410, 510 First evaluation means
15, 420, 520 Second evaluation means (evaluation means)
16 Fractionation means
17 direct current power supply
18, 19, 22, 24 Cable
20 Evaluation electrode
21 Potentiometer
23, 202 Flow path
30 Nanocarbon dispersion liquid
41, 42, 43 Recovery tank
201 Evaluation means
411 pH sensor
412 pH meter
511 Light source
512 Detector

The invention claimed is:

1. A nanocarbon separation device, comprising:
a separation tank that is configured to accommodate a dispersion liquid including nanocarbons;
a first electrode that is provided at an upper part in the separation tank;
a second electrode that is provided at a lower part in the separation tank;
an evaluation unit that is configured to evaluate a physical state or a chemical state of the dispersion liquid; and
a fractionation unit that is configured to fractionate the dispersion liquid based on the physical state or the chemical state.

2. The nanocarbon separation device according to claim 1, wherein the evaluation unit is provided between the separation tank and the fractionation unit.

3. The nanocarbon separation device according to claim 1, wherein the evaluation unit is provided in the separation tank.

4. The nanocarbon separation device according to claim 2, wherein the evaluation unit is further provided in the separation tank.

5. The nanocarbon separation device according to claim 1, wherein the evaluation unit includes two evaluation units provided between the separation tank and the fractionation unit via a flow path that connects the separation tank to the fractionation unit.

6. The nanocarbon separation device according to claim 1, wherein the evaluation unit is at least one of a unit that is configured to measure a potential of the dispersion liquid, a unit that is configured to measure a pH of the dispersion liquid, a unit that is configured to measure an absorbance of the dispersion liquid, a unit that is configured to measure an emission spectrum of the dispersion liquid, a unit that is configured to measure a refractive index of the dispersion liquid, and a unit that is configured to measure a conductivity of the dispersion liquid.

7. A nanocarbon separation method, comprising:
injecting a dispersion liquid including nanocarbons into a separation tank;
separating the metallic nanocarbons and the semiconducting nanocarbons by applying a direct current voltage between a first electrode provided at an upper part in the separation tank and a second electrode provided at a lower part in the separation tank, to cause metallic nanocarbons included in the dispersion liquid to move toward the first electrode, and to cause semiconducting nanocarbons included in the dispersion liquid to move toward the second electrode;
evaluating a physical state or a chemical state of the dispersion liquid; and
fractionating the dispersion liquid based on the physical state or the chemical state.

8. The nanocarbon separation method according to claim 7, wherein the evaluating a physical state or a chemical state of the dispersion liquid is performed between the separating the metallic nanocarbons and the semiconducting nanocarbons and the fractionating the dispersion liquid.

9. The nanocarbon separation method according to claim 7, wherein the evaluating a physical state or a chemical state of the dispersion liquid is performed during the separating the metallic nanocarbons and the semiconducting nanocarbons.

10. The nanocarbon separation method according to claim 7, wherein the evaluating a physical state or a chemical state of the dispersion liquid is performed before or after a flow path that connects a fractionation unit which is configured to fractionate the separation tank and the dispersion liquid.

11. The nanocarbon separation method according to claim 7, wherein, in the evaluating a physical state or a chemical state of the dispersion liquid, the physical state or the chemical state of the dispersion liquid is evaluated according to at least one of a potential of the dispersion liquid, a pH of the dispersion liquid, an absorbance of the dispersion liquid, an emission spectrum of the dispersion liquid, a refractive index of the dispersion liquid, and a conductivity of the dispersion liquid.

* * * * *